US012399457B2

United States Patent
Suzuki et al.

(10) Patent No.: US 12,399,457 B2
(45) Date of Patent: Aug. 26, 2025

(54) IMAGE FORMING APPARATUS INCLUDING DEVICE MAIN BODY AND CONSUMABLE ATTACHABLE THERETO AND INCLUDING CONSUMABLE MEMORY FOR STORING RECYCLING HISTORY INFORMATION

(71) Applicant: BROTHER KOGYO KABUSHIKI KAISHA, Nagoya (JP)

(72) Inventors: Takashi Suzuki, Nagoya (JP); Tadao Kyotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/633,100

(22) Filed: Apr. 11, 2024

(65) Prior Publication Data
US 2024/0272577 A1 Aug. 15, 2024

Related U.S. Application Data

(63) Continuation of application No. PCT/JP2022/037805, filed on Oct. 11, 2022.

(30) Foreign Application Priority Data

Oct. 14, 2021 (JP) .................................. 2021-169053

(51) Int. Cl.
G03G 15/08 (2006.01)
G03G 15/00 (2006.01)
(Continued)

(52) U.S. Cl.
CPC .............. *G03G 21/10* (2013.01); *G03G 15/50* (2013.01); *G03G 15/556* (2013.01); *G03G 21/02* (2013.01);
(Continued)

(58) Field of Classification Search
CPC ...... G03G 15/50; G03G 15/556; G03G 21/02; G03G 21/10; G06K 15/4075
(Continued)

(56) References Cited

U.S. PATENT DOCUMENTS 8,070,128 B2 * 12/2011 Snyder .................. F16K 31/043
251/40
8,145,074 B2 * 3/2012 Kim ........................ G03G 15/55
399/12
(Continued)

FOREIGN PATENT DOCUMENTS

CN 101299142 * 11/2008
JP 2004-286951 A 10/2004
(Continued)

OTHER PUBLICATIONS

International Search Report published with related PCT /JP2022/037805, Dec. 6, 2022.
(Continued)

*Primary Examiner* — Hoan H Tran
(74) *Attorney, Agent, or Firm* — Merchant & Gould P.C.

(57) ABSTRACT

An image forming apparatus includes a device main body, a consumable, and a controller. The consumable is attachable to the device main body. The consumable includes a consumable memory for storing therein recycling history information indicating a recycling history of the consumable. The consumable memory includes a first storage area to which a usage amount of the consumable can be written and a second storage area to which the usage amount of the consumable can be written. The controller is configured to perform a determining process to determine, based on the recycling history information, one of the first storage area and the second storage area as a storage area to which the usage amount is to be written.

27 Claims, 12 Drawing Sheets

(51) Int. Cl.
*G03G 21/02* (2006.01)
*G03G 21/10* (2006.01)
*G06K 15/00* (2006.01)

(52) U.S. Cl.
CPC ... *G06K 15/4075* (2013.01); *G06K 2215/101* (2013.01)

(58) Field of Classification Search
USPC .......................................... 399/9, 24–27, 111
See application file for complete search history.

(56) References Cited

U.S. PATENT DOCUMENTS

| | | | |
|---|---|---|---|
| 11,619,899 B2* | 4/2023 | Tanaka | G03G 15/0863 399/12 |
| 2004/0223772 A1 | 11/2004 | Nakazato | |
| 2009/0034994 A1 | 2/2009 | Chihara | |

FOREIGN PATENT DOCUMENTS

| | | |
|---|---|---|
| JP | 2009-53681 A | 3/2009 |
| JP | 2009-223200 A | 10/2009 |
| JP | 2014-195984 A | 10/2014 |
| JP | 2015-020315 A | 2/2015 |
| JP | 2017-207529 A | 11/2017 |
| JP | 2018-173526 A | 11/2018 |
| JP | 2002-101243 A | 4/2022 |

OTHER PUBLICATIONS

International Preliminary Report on Patentability issued in International Patent Application No. PCT/JP2022/037805, Apr. 16, 2024.

* cited by examiner

FIG. 5

| ADDRESS | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0x0000 | \multicolumn{16}{c|}{MANAGEMENT INFORMATION AREA} | ~42A |
| 0x0010 | READ/WRITE AREA ||||||||||||||||~42B |
| 0x0020 | READ ONLY AREA (1/3) ||||||||||||||||~42C |
| 0x0030 | READ ONLY AREA (2/3) ||||||||||||||||~42D |
| 0x0040 | READ ONLY AREA (3/3) ||||||||||||||||~42E |

⟨ AFTER RECYCLING (4N+1) TIMES ⟩ M2

| ADDRESS | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0x0000 | MANAGEMENT INFORMATION AREA ||||||||||||||||~42A |
| 0x0010 | READ ONLY AREA (1/3) ||||||||||||||||~42B |
| 0x0020 | READ/WRITE AREA ||||||||||||||||~42C |
| 0x0030 | READ ONLY AREA (2/3) ||||||||||||||||~42D |
| 0x0040 | READ ONLY AREA (3/3) ||||||||||||||||~42E |

⟨ AFTER RECYCLING (4N+2) TIMES ⟩ M3

| ADDRESS | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0x0000 | MANAGEMENT INFORMATION AREA ||||||||||||||||~42A |
| 0x0010 | READ ONLY AREA (1/3) ||||||||||||||||~42B |
| 0x0020 | READ ONLY AREA (2/3) ||||||||||||||||~42C |
| 0x0030 | READ/WRITE AREA ||||||||||||||||~42D |
| 0x0040 | READ ONLY AREA (3/3) ||||||||||||||||~42E |

⟨ AFTER RECYCLING (4N+3) TIMES ⟩ M4

| ADDRESS | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0x0000 | MANAGEMENT INFORMATION AREA ||||||||||||||||~42A |
| 0x0010 | READ ONLY AREA (1/3) ||||||||||||||||~42B |
| 0x0020 | READ ONLY AREA (2/3) ||||||||||||||||~42C |
| 0x0030 | READ ONLY AREA (3/3) ||||||||||||||||~42D |
| 0x0040 | READ/WRITE AREA ||||||||||||||||~42E |

| ADDRESS | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0x0000 | \multicolumn{16}{c|}{MANAGEMENT INFORMATION AREA} | ~42F |
| 0x0010 | \multicolumn{16}{c|}{FIRST AREA} | ~42G |
| 0x0020 | \multicolumn{16}{c|}{THIRD AREA} | ~42H |
| 0x0030 | \multicolumn{16}{c|}{SECOND AREA} | ~42I |
| 0x0040 | \multicolumn{16}{c|}{FOURTH AREA} | ~42J |

IMAGE FORMING APPARATUS INCLUDING DEVICE MAIN BODY AND CONSUMABLE ATTACHABLE THERETO AND INCLUDING CONSUMABLE MEMORY FOR STORING RECYCLING HISTORY INFORMATION

REFERENCE TO RELATED APPLICATIONS

This is a by-pass continuation application of International Application No. PCT/JP2022/037805 filed on Oct. 11, 2022 claiming priority from Japanese Patent Application No. 2021-169053 filed on Oct. 14, 2021. The entire contents of the International Application and the priority application are incorporated herein by reference.

BACKGROUND ART

There is an upper limit on the number of writes that a control unit can perform to write information to nonvolatile memory. Write operations degrade the nonvolatile memory. If the number of write operations exceeds the upper limit, information can no longer be written to the memory, or the quality of the written information can no longer be guaranteed. In other words, the upper limit for the number of writes denotes the maximum number of writes for which the quality of information stored in the nonvolatile memory is guaranteed. Nonvolatile memory having such an upper limit on the number of writes is used as consumable memory for managing the service life of a consumable and the like.

There has been known an image forming apparatus to which a consumable part including a storage unit for storing therein information is detachably attachable. The conventional image forming apparatus includes a counting unit, a measuring unit, and a control unit. The counting unit counts the number of times the storage unit is accessed. The measuring unit measures a usage amount of the consumable part. The control unit controls the frequency of accesses to the storage unit based on the number of accesses and the usage amount of the consumable part.

Consumables such as toner cartridges attached to a printer are preferably recyclable.

SUMMARY

However, a problem with the conventional technology is that when the consumable is refilled with printing material, information related to the consumable can no longer be written to the consumable memory once the number of rewrites for information stored in the consumable memory reaches the upper limit.

It is an object of the present disclosure to provide an image forming apparatus that can suppress the number of rewrites to a consumable memory from reaching an upper limit when a consumable is refilled with printing material without replacing the consumable memory.

In order to attain the above and other objects, according to one aspect, the present disclosure provides an image forming apparatus including a device main body, a consumable, and a controller. The consumable is attachable to the device main body. The consumable includes a consumable memory for storing therein recycling history information. The recycling history information indicates a recycling history of the consumable. The consumable memory includes a first storage area and a second storage area. The first storage area is a storage area to which a usage amount of the consumable can be written. The second storage area is a storage area to which the usage amount of the consumable can be written. The controller is configured to perform a determining process to determine, based on the recycling history information, one of the first storage area and the second storage area as a storage area to which the usage amount is to be written.

According to another aspect, the present disclosure provides a consumable memory for use by a consumable. The consumable memory is for storing therein recycling history information. The recycling history information indicates a recycling history of the consumable. The consumable memory includes a first storage area and a second storage area. The first storage area is a storage area to which a usage amount of the consumable can be written. The second storage area is a storage area to which the usage amount of the consumable can be written. Based on the recycling history information, one of the first storage area and the second storage area can be determined as a storage area to which the usage amount is to be written.

According to still another aspect, the present disclosure provides a recycling method of recycling a consumable. The consumable includes a consumable memory for storing therein recycling history information. The recycling history information indicates a recycling history of the consumable. The consumable memory includes a first storage area and a second storage area. The first storage area is a storage area to which a usage amount of the consumable can be written. The second storage area is a storage area to which the usage amount of the consumable can be written. The recycling method includes determining, based on the recycling history information, one of the first storage area and the second storage area as a storage area to which the usage amount is to be written.

In the above configurations, the number of rewrites to the consumable memory can be suppressed from reaching an upper limit when the consumable is refilled with printing material without replacing the consumable memory.

The image forming apparatus according to the above aspect of the present disclosure may be realized by a computer. In this case, a control program for implementing the image forming apparatus with the computer by controlling the computer to operate as the various parts (software elements) of the image forming apparatus, and a computer-readable storage medium that stores this control program also fall within the scope of the present disclosure.

BRIEF DESCRIPTION OF DRAWINGS

FIG. 5 is a diagram illustrating an example of memory maps used in the toner memory.

DESCRIPTION

First Embodiment

Below, an image forming apparatus 1 according to a first embodiment of the present disclosure will be described while referring to the accompanying drawings. This embodiment will describe an example in which the image forming apparatus 1 is a laser printer and the image formation is printing. However, the image forming apparatus 1 may be a printer other than a laser printer. For example, the image forming apparatus 1 may be an inkjet printer.

<Overall Structure of Image Forming Apparatus 1>

Figure 1:
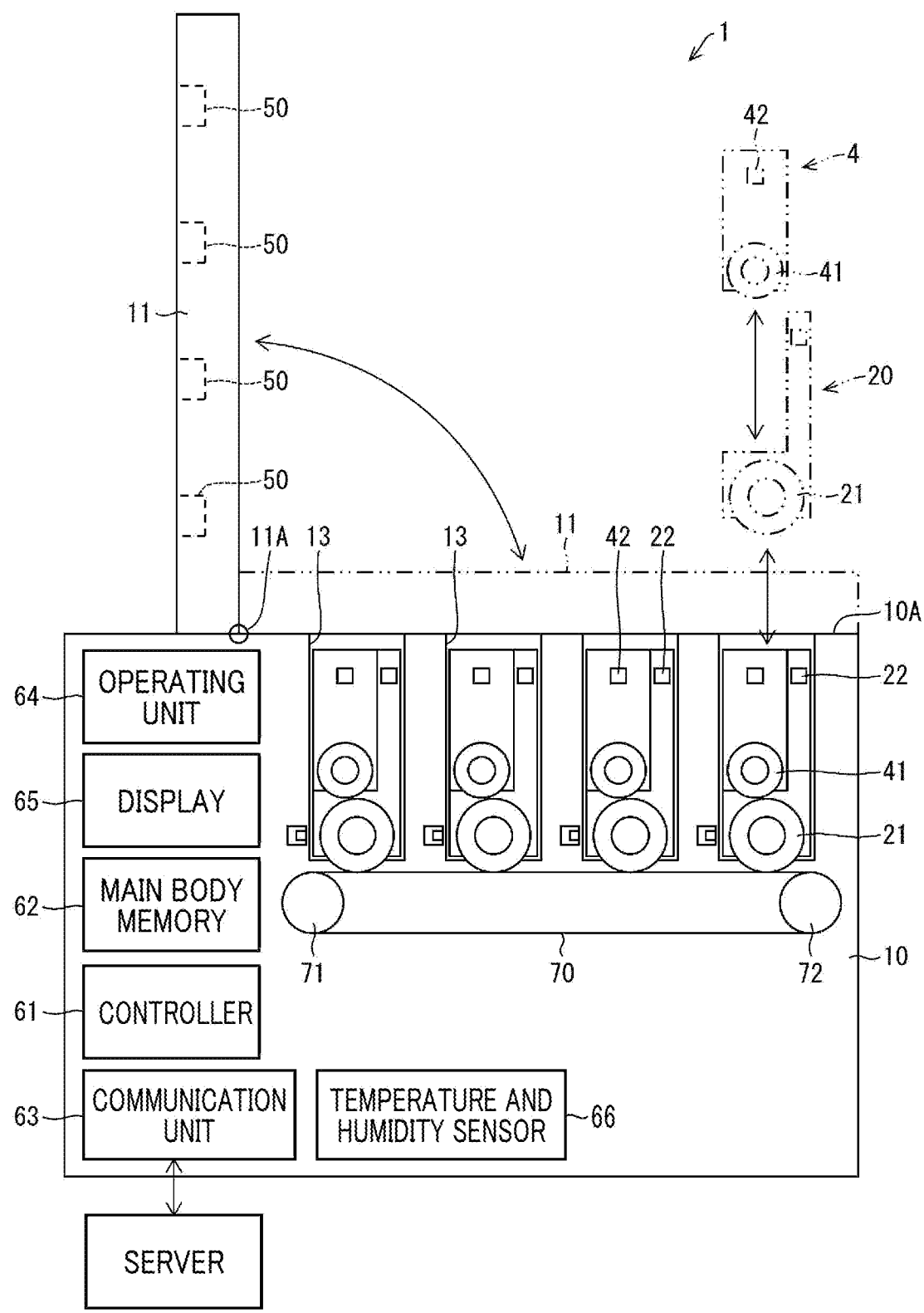
FIG. 1 is a schematic diagram illustrating an image forming apparatus.
Figure 2:
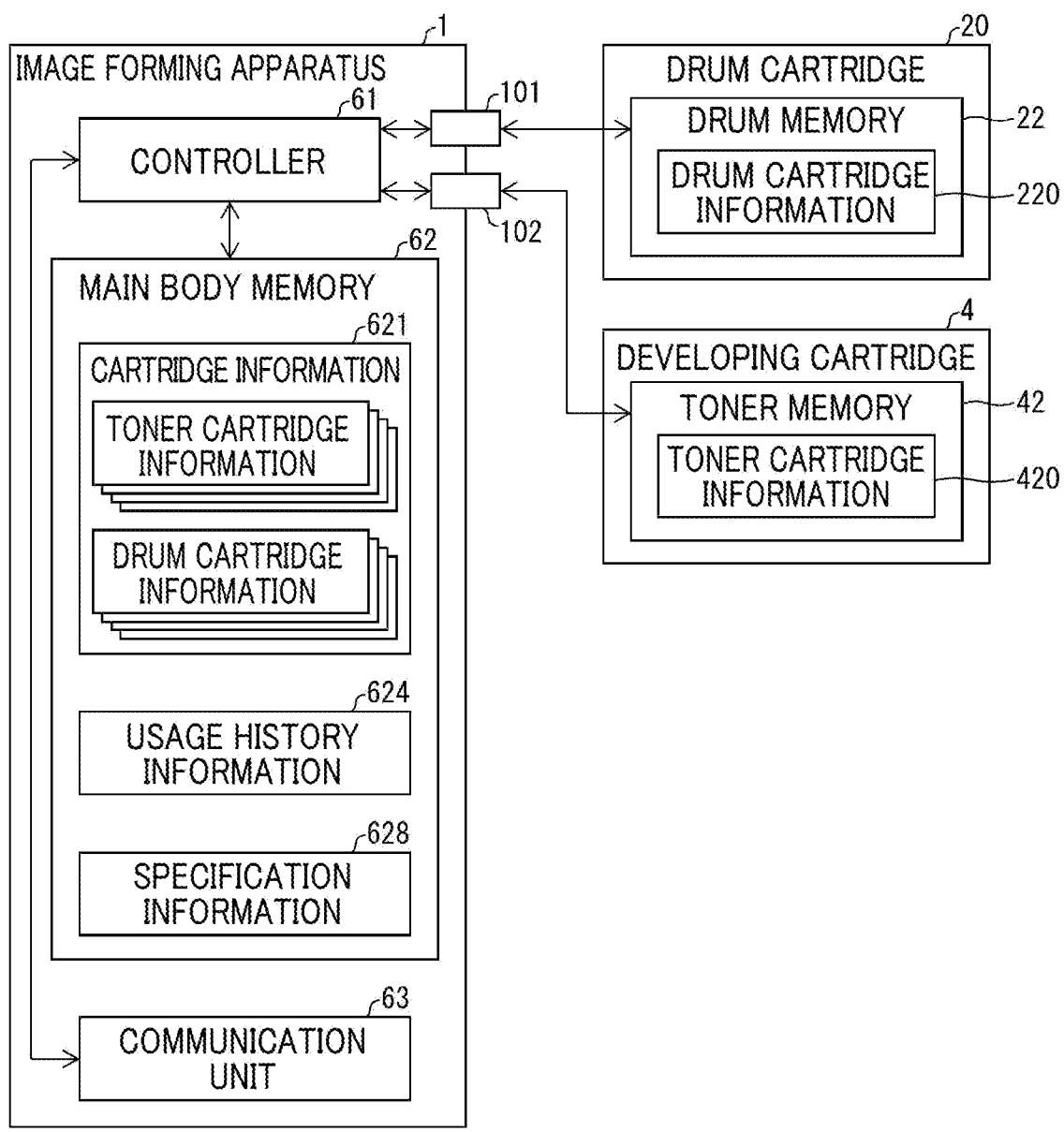
FIG. 2 is a diagram illustrating a main part of the image forming apparatus, which includes a drum cartridge and a developing cartridge.

FIG. 1 is a schematic diagram illustrating the image forming apparatus 1. FIG. 2 illustrates the internal structure of the image forming apparatus 1, which includes drum cartridges 20 and developing cartridges 4.

As shown in FIG. 1, the image forming apparatus 1 is configured of a main body casing 10, and a cover 11.

The image forming apparatus 1 includes a temperature and humidity sensor 66. The temperature and humidity sensor 66 is an example of the sensor of the present disclosure. The temperature and humidity sensor 66 is a sensor configured to measure at least one of temperature and humidity inside the main body casing 10. The temperature and humidity sensor 66 is electrically connected to a controller 61. The temperature and humidity sensor 66 is configured to output measurement results to the controller 61. There are no particular restrictions on the type of the temperature and humidity sensor 66 and the output format of the measurement results. The temperature and humidity sensor 66 in the present embodiment is assumed to measure both temperature and humidity and output the measurement results to the controller 61. However, the temperature and humidity sensor 66 may be configured to measure only one of either temperature or humidity and output the measurement results to the controller 61.

In this embodiment, the temperature and humidity sensor 66 of the image forming apparatus 1 may periodically measure temperature and humidity and output the measurement results to the controller 61. In this case, the temperature and humidity sensor 66 may autonomously measure temperature and/or humidity based on a real-time clock or the like in the image forming apparatus 1 without being triggered by an instruction from the controller 61.

The image forming apparatus 1 may also include a density sensor. The density sensor is an example of the sensor provided in the image forming apparatus 1. The density sensor is a sensor configured to measure print density. The density sensor is electrically connected to the controller 61. The density sensor is configured to output measurement results to the controller 61. In this embodiment, the density sensor of the image forming apparatus 1 may periodically measure density (e.g., once a day) and output the measurement results to the controller 61.

(Main Body Casing 10)

The main body casing 10 is an example of the device main body of the present disclosure. The developing cartridges 4 are attached to the main body casing 10 of the image forming apparatus 1. As will be described later in detail, each developing cartridge 4 is integrated with the drum cartridge 20 when attached to the drum cartridge 20. In other words, in a state where the developing cartridge 4 is attached to the drum cartridge 20, the developing cartridge 4 is attached to the main body casing 10 together with the drum cartridge 20.

Note that four developing cartridges 4 are attached to the image forming apparatus 1 of the present embodiment. In other words, four drum cartridges 20 and four developing cartridges 4 are attachable to the image forming apparatus 1 according to the present embodiment. However, the numbers of drum cartridges 20 and developing cartridges 4 which are attachable to the image forming apparatus 1 are not limited to the example of FIG. 1. For example, the image forming apparatus 1 may be a monochrome printer to which a single drum cartridge 20 and a single developing cartridge 4 are attachable.

The developing cartridges 4 accommodate toner. The image forming apparatus 1 is configured to consume the toner accommodated in the developing cartridges 4 to perform printing. In other words, the developing cartridges 4 are consumables used in the image forming apparatus 1. Further, each drum cartridge 20 includes a photosensitive drum 21. The image forming apparatus 1 uses the photosensitive drums 21 when performing printing. The drum cartridges 20 are also examples of consumables used in the image forming apparatus 1.

The main body casing 10 has a rectangular box shape, for example. The image forming apparatus 1 includes the four drum cartridges 20, the four developing cartridges 4, a transfer belt 70, the controller 61, a main body memory 62, a communication unit 63, an operating unit 64, and a display 65. The four drum cartridges 20, four developing cartridges 4, transfer belt 70, controller 61, main body memory 62, communication unit 63, operating unit 64, and display 65 are accommodated in the main body casing 10. In a case where hardware buttons are employed as the operating unit 64, the pressing surfaces of the operating unit 64 may be located at the outer surface of the main body casing 10 so as to be operable by the user. The display surface of the display 65 may also be provided at the outer surface of the main body casing 10 so that the user can view displayed information. The display 65 may be integrally configured with a touchscreen so as to function also as an operating unit. Accordingly, the display 65 is an example of the operating unit of the present disclosure.

The main body casing 10 includes four cartridge holding parts 13. The cartridge holding parts 13 are formed as recesses and have openings. The drum cartridges 20 and developing cartridges 4 are attached to the main body casing 10 by being held in the corresponding cartridge holding parts 13.

(Cover 11)

The cover 11 of the image forming apparatus 1 includes a light source unit 50 for each of the drum cartridges 20. That is, the image forming apparatus 1 includes four light source units 50. The cover 11 is movable between an open position (depicted with a solid line in FIG. 1) in which the cover 11 opens an opening 10A provided in the top end portion of the main body casing 10, and a closed position (depicted with a two-dot dash line in FIG. 1) in which the cover 11 closes the opening 10A. More specifically, the cover 11 is pivotally movable about a rotational shaft 11A between the open position and the closed position. The rotational shaft 11A extends in a first direction. The opening 10A is opened and closed by the pivotal movement of the cover 11.

The openings of the cartridge holding parts 13 are opened when the cover 11 is in the open position and are covered by the cover 11 when the cover 11 is in the closed position.

A closure sensor (not shown) may be provided in the opening 10A of the main body casing 10. The closure sensor is a sensor configured to detect that the cover 11 is in the closed position. The closure sensor may be a contact-type sensor or an optical sensor, for example.

(Developing Cartridges 4)

Each developing cartridge 4 includes a cartridge body. The cartridge body can accommodate therein a developing roller 41 and developer (e.g., toner) as an example of the printing material. The cartridge body is attachable to the main body casing 10. The four developing cartridges 4 accommodate developer in mutually different colors (e.g., the colors cyan, magenta, yellow, and black) as the material used for performing image formation. The developer is material that is consumed by use. When the developing cartridge 4 is attached to the drum cartridge 20, the outer circumferential surface of the photosensitive drum 21 comes in contact with the outer circumferential surface of the developing roller 41.

As shown in FIG. 2, each developing cartridge 4 also includes a toner memory 42 (a consumable memory). The toner memory 42 is disposed at the outer surface of one end portion of the developing cartridge 4 in the first direction. The toner memory 42 is a memory that is readable and writable for information. For example, the toner memory 42 may be flash read-only memory (flash ROM) or electrically erasable programmable read-only memory (EEPROM). "EEPROM" is a registered Japanese trademark of Renesas Electronics Corporation.

The toner memory 42 stores therein toner cartridge information 420, which is information related to the developing cartridge 4. The data structure of the toner cartridge information 420 will be described later with reference to FIG. 3.

(Drum Cartridges 20)

Each drum cartridge 20 includes a cartridge body. The drum cartridge 20 also includes the photosensitive drum 21 as a part used in performing image formation. The photosensitive drum 21 is a replacement part that requires replacement because degradation such as its surface becoming worn occurs through use. The outer circumferential surface of the photosensitive drum 21 is covered with a photosensitive material.

The drum cartridge 20 also may include a drum memory 22 (a consumable memory). The drum memory 22 is a memory that is readable and writable for information. The drum memory 22 is flash ROM or EEPROM, for example.

As shown in FIG. 2, the drum memory 22 stores therein drum cartridge information 220, which is information related to the drum cartridge 20. The data structure of the drum cartridge information 220 will be described later with reference to FIG. 4.

(Cartridge Attachment and the Printing Mechanism)

As shown in FIG. 1, the drum cartridges 20 and developing cartridges 4 are attached to the main body casing 10 in a state where the cover 11 is in the open position. In this state, the drum cartridges 20 and developing cartridges 4 are inserted through the opening 10A into the corresponding cartridge holding parts 13.

The four light source units 50 are assembled at the inner surface of the cover 11. In a state where the drum cartridges 20 are attached to the main body casing 10 and the cover 11 is in the closed position, each light source unit 50 is arranged to face the surface of the corresponding photosensitive drum 21. Each light source unit 50 has a plurality of light sources aligned in the first direction. The light sources can irradiate light onto the outer circumferential surface of the corresponding photosensitive drum 21. The light sources are light-emitting diodes (LEDs), for example.

Each light source unit 50 is electrically connected to the controller 61. The controller 61 is configured to control the light sources of each light source unit 50 to emit light based on inputted image data. The light sources irradiate light toward the outer circumferential surfaces of the photosensitive drums 21. As a result, the photosensitive material on the outer circumferential surfaces of the photosensitive drums 21 is exposed to light in accordance with the image data.

The transfer belt 70 is a part that transfers developer (e.g., toner) present on the surface of each photosensitive drum 21 onto printing paper. The transfer belt 70 is a replacement part that requires replacing because degradation such as its surface becoming worn occurs through use. The transfer belt 70 is a belt having an annular shape (an endless belt) that can contact each of the photosensitive drums 21. The outer circumferential surfaces of the photosensitive drums 21 can contact the outer surface of the transfer belt 70. During a printing process, printing paper is conveyed between the transfer belt 70 and the photosensitive drums 21.

The transfer belt 70 is stretched around a drive roller 71 and a follow roller 72. The drive roller 71 is configured to drive the transfer belt 70. The controller 61 is configured to rotate the drive roller 71. The follow roller 72 rotates along with the movement of the transfer belt 70 associated with the drive of the drive roller 71.

(Internal Structure of Main Casing)

The controller 61 includes an application-specific integrated circuit (ASIC), for example. The controller 61 is electrically connected to both the main body memory 62 and the communication unit 63 provided in the main body casing 10 of the image forming apparatus 1. Although not shown in FIG. 2, the operating unit 64 and display 65 are also electrically connected to the controller 61. The controller 61 executes various operations to cause the image forming apparatus 1 to perform various printing-related processes.

The controller 61 may also include a processor, such as a central processing unit (CPU). In this case, a control program for implementing a control method of the image forming apparatus may be stored in the main body memory 62 and the processor may operate according to the control program so that the controller 61 will cause the image forming apparatus 1 to perform the various processes.

The controller 61 may include a computer-readable storage medium, such as the main body memory 62, that stores therein the control program. A "non-transitory, tangible medium," such as read-only memory (ROM), as well as tapes, discs, cards, semiconductor memory, or programmable logic circuits can be employed as the storage medium. Random-access memory (RAM) or the like may also be used for developing the control program. The control program may also be supplied to the computer via any transmission medium (a communication network, broadcast waves, etc.) capable of transmitting the control program. Note that one embodiment of the present disclosure can be implemented in the form of data signals embedded in a carrier wave that is the resultant of embodying the control program through electronic transmission.

As shown in FIG. 2, the image forming apparatus 1 includes connectors 101 and connectors 102. When each drum cartridge 20 is inserted into the corresponding cartridge holding part 13 shown in FIG. 1, the corresponding connector 101 becomes electrically connected to the drum memory 22 of the inserted drum cartridge 20, enabling the controller 61 to communicate with that drum memory 22. In other words, the controller 61 can execute a read process to read information from the drum memory 22, and a write process (including a rewrite process) to write information to the drum memory 22.

When each developing cartridge 4 is attached to the main body casing 10, the corresponding connector 102 becomes electrically connected to the toner memory 42 of the attached developing cartridge 4, enabling the controller 61 to communicate with that toner memory 42. In other words, the controller 61 can execute a read process to read information from the toner memory 42, and a write process (including a rewrite process) to write information to the toner memory 42.

The main body memory 62 is a memory that is readable and writable for information. The main body memory 62 is flash ROM or EEPROM, for example. The main body memory 62 has one or more storage areas. Each area stores therein various information, as in the following example.

Cartridge information 621 is information related to cartridges that are attached to the image forming apparatus 1. Specifically, the cartridge information 621 includes toner cartridge information 420 read from the toner memory 42 of each color of developing cartridge 4 such that the cartridge information 420 can be identified for each individual developing cartridge 4. The cartridge information 621 also includes drum cartridge information 220 read from the drum memory 22 of each drum cartridge 20 such that the drum cartridge information 220 can be identified for each individual drum cartridge 20. The toner cartridge information 420 includes usage amount information indicating the amount of usage of the developing cartridge 4, for example. The drum cartridge information 220 includes usage amount information indicating the amount of usage of the drum cartridge 20, for example. The data structures of the toner cartridge information 420 and drum cartridge information 220 stored as the cartridge information 621 will be described later in detail with reference to FIGS. 3 and 4.

In the following description, "recycling a cartridge" refers to restoring a cartridge to a condition that is suitable for use in printing by replacing or replenishing only those components of the cartridge that need replacing. In other words, recycling a cartridge includes not only the act of replenishing a consumed material, but also the act of replacing a degraded replacement part with a new part. Hereinafter, cartridges (consumables) that have been recycled by replenishing materials or replacing parts will be referred to as recycled cartridges (recycled products).

Usage history information 624 specifies the history of using recycled cartridges on the image forming apparatus 1. For example, the usage history information 624 may be information indicating the number of recycled cartridges that have been attached to the image forming apparatus 1 up to the present moment (how many recycled cartridges have been attached to the image forming apparatus 1 up to the present moment). As another example, the usage history information 624 may be a table storing therein a combination of the cartridge ID and the recycle count (the number of times that the cartridge has been recycled) for each recycled cartridge. As yet another example, the usage history information 624 may be a flag indicating whether a recycled cartridge has been attached at least once to the image forming apparatus 1 or never.

Specification information 628 indicates specifications of the image forming apparatus 1. For example, the image forming apparatus 1 and consumables in this embodiment have been manufactured to specifications conforming to circumstances of the country in which they are to be used. For example, the image forming apparatus 1 and consumables may have one of three different specifications intended for the EU (Europe), the U.S. (America), and JP (Japan), respectively. The specification information 628 indicates one of the above specifications.

In addition to the information described above, the main body memory 62 may have an area for storing the cumulative number of sheets printed on the image forming apparatus 1, and an area for storing error conditions occurring in the image forming apparatus 1, for example.

<Data Structures of Cartridge Information>

(Toner Cartridge Information)

Figure 3:
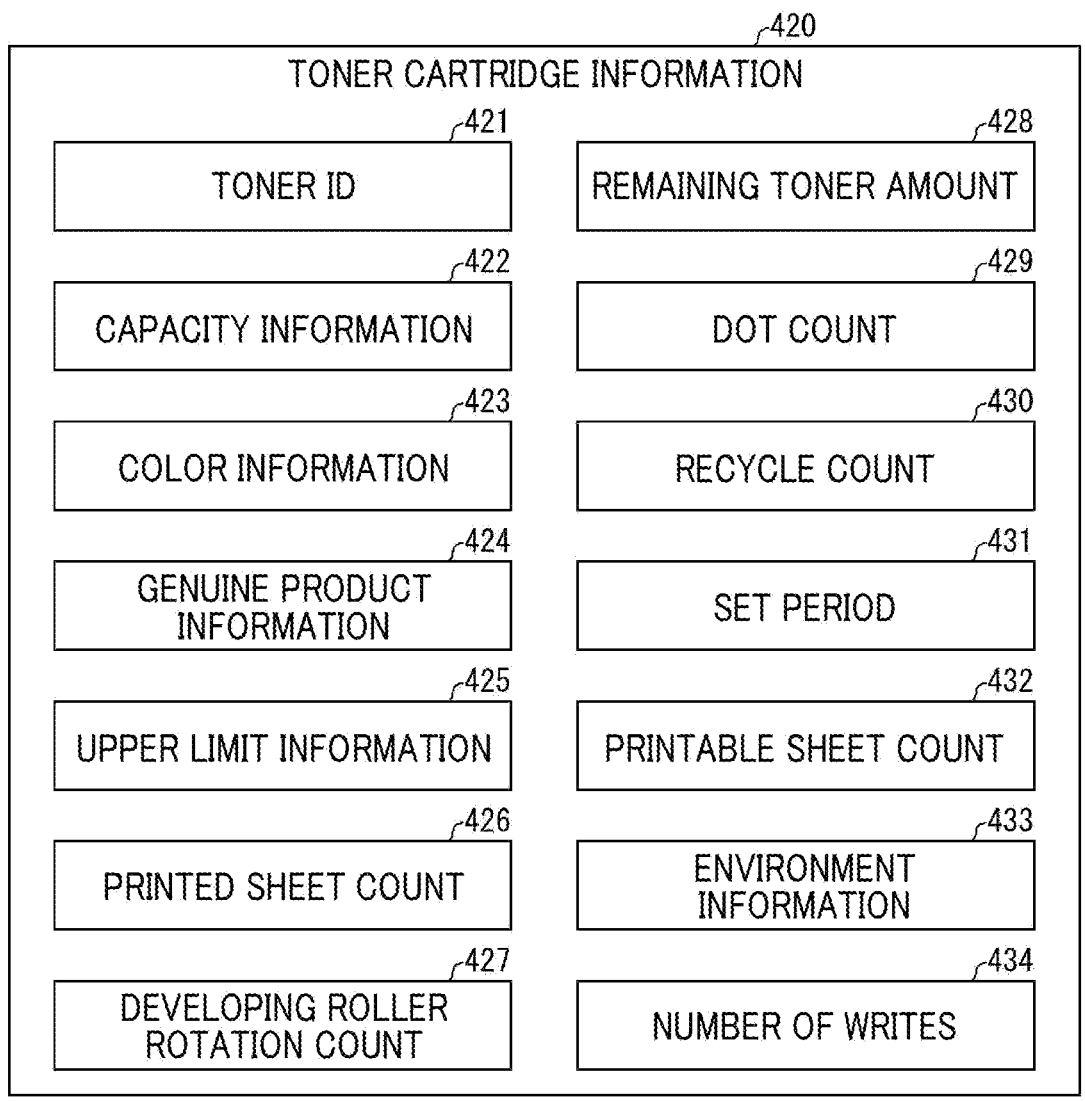
FIG. 3 is a diagram illustrating an example of the data structure of toner cartridge information stored in a toner memory.

FIG. 3 illustrates an example of the data structure of the toner cartridge information 420 stored in the toner memory 42. As an example, the toner cartridge information 420 includes a toner ID 421, capacity information 422, color information 423, genuine product information 424, upper limit information 425, set period information 431, printable sheet count information 432, environment information 433, the number of writes 434, usage amount information, and initialization information.

The usage amount information indicates the usage amount of the consumable. The usage amount information is an example of the usage amount of the present disclosure. As an example, the usage amount information includes at least one of consumption information for identifying the extent to which the consumable has been used, and remaining amount information for identifying the amount of material remaining in the consumable. Examples of the consumption information include, but are not limited to, the number of printed sheets (the printed sheet count), the dot count, the usage amount of printing material, the number of developing roller rotations (the developing roller rotation count), and the number of drum rotations (the drum rotation count). Examples of the remaining amount information include, but are not limited to, the remaining amount of printing material such as the remaining toner amount or the remaining ink amount.

As examples of the usage amount information, the toner cartridge information 420 of the developing cartridge 4 includes a printed sheet count 426, a developing roller rotation count 427, a remaining toner amount 428 (amount of remaining printing material), and a dot count 429. The initialization information indicates whether at least some of the information stored in the consumable memory has been initialized according to user instructions. An example of the initialization information is a recycle count 430. The recycle count 430 indicates the number of times the toner memory 42 has been initialized for recycling.

The various information described above is merely an example of the toner cartridge information 420. Other information may be added to this information and some of the various information described above may be omitted as needed.

The toner ID 421 is identification information for uniquely identifying the developing cartridge 4. As an example, the toner ID 421 is a serial number unique to the developing cartridge 4.

The capacity information 422 specifies the capacity of the toner cartridge 4 that can be refilled with printing material. For example, when recycling the developing cartridge 4 in the present embodiment, one of three levels can be selected as the capacity of the developing cartridge 4. More specifically, the developing cartridge 4 can be recycled as a cartridge having a capacity selected from one of the three levels "small capacity", "standard capacity", and "large capacity" in order from least to greatest. That is, the capacity information 422 includes small capacity information, standard capacity information, and large capacity information. Put another way, the capacity information 422 includes first capacity information and second capacity information indicating a capacity smaller than the first capacity information.

The color information 423 indicates the color of printing material accommodated in the developing cartridge 4. In the example of the present embodiment, the developing cartridges 4 hold one of the four colors cyan (C), magenta (M), yellow (Y), and black (BK). The color information 423 indicates one of the above colors.

The genuine product information 424 indicates whether the developing cartridge 4 is genuine or non-genuine. For example, each developing cartridge 4 is classified as either "genuine" or "non-genuine", and the genuine product information 424 indicates one of these classifications.

The upper limit information 425 specifies an upper limit on the number of writes to the toner memory 42. More specifically, the upper limit on the number of writes to the tone memory 42 is the maximum number of writes within which the quality of information stored in the toner memory 42 is guaranteed.

The printed sheet count 426 indicates the cumulative number of sheets printed by the image forming apparatus 1 using the developing cartridge 4. The printed sheet count 426 is an example of the printed sheet count information of the present disclosure. In other words, this information specifies the number of sheets of paper that have been printed by the image forming apparatus 1 since the attachment of the developing cartridge 4 to the image forming apparatus 1.

The developing roller rotation count 427 indicates the number of times the developing roller 41 of the developing cartridge 4 has rotated due to executions of printing since the developing cartridge 4 was attached to the image forming apparatus 1.

The remaining toner amount 428 indicates the remaining amount of toner in the developing cartridge 4. For example, the remaining toner amount 428 may be configured of a value corresponding to one of a plurality of levels from full to empty. The remaining toner amount 428 may be configured of a character string, or a numerical value, or a combination of a character string and a numerical value. For example, the remaining toner amount 428 may be configured of one of the character strings "full" to "empty", or one of the numeral values "100%" to "0%".

The initial value of the remaining toner amount 428 is equivalent to the amount of toner with which the capacity corresponding to the capacity information 422 is fully filled. For example, a sensor (not shown) may optically measure the developing cartridge 4 as toner is consumed through use. The controller 61 may write the remaining toner amount obtained through the above measurements in the toner memory 42 as the remaining toner amount 428.

As another example, the controller 61 may monitor the amount of toner discharged and consumed from the developing cartridge 4 and may calculate a remaining toner amount based on the capacity information 422 stored in the toner memory 42 and the monitored toner consumption. The controller 61 may then write the calculated remaining toner amount to the toner memory 42 as the remaining toner amount 428.

The dot count 429 indicates the cumulative number of dots printed by the image forming apparatus 1 using the developing cartridge 4. The dot count 429 is an example of the dot count information of the present disclosure. In other words, this information indicates the cumulative number of dots that have been printed in the image forming apparatus 1 since the developing cartridge 4 was attached to the image forming apparatus 1.

The recycle count 430 is information indicating the number of times that at least some of the information stored in the toner memory 42 of the developing cartridge 4 has been initialized in accordance with user instructions (an initialization count).

The set period information 431 indicates a set guarantee period, which is set for the developing cartridge 4. More specifically, this information indicates a guarantee period in years as a time-based threshold for the developing cartridge 4 after recycling. The set period can be freely set to any year, such as 2 years, 3 years, 5 years, 10 years, or the like. In other words, the set period information 431 specifies a value such as 2, 3, 5, or 10.

The printable sheet count information 432 indicates the number of sheets that can be printed by the image forming apparatus using the amount of printing material specified by the capacity information. The printable sheet count information 432 is stored in association with the capacity information 422. The printable sheet count information 432 includes information indicating the number of printable sheets corresponding to the large capacity information as a first printable sheet count. The printable sheet count information 432 further includes information indicating the number of printable sheets corresponding to the standard capacity information as a second printable sheet count. The printable sheet count information 432 further includes information indicating the number of printable sheets corresponding to the small capacity information as a third printable sheet count.

The environment information 433 is information periodically obtained by sensors provided in the image forming apparatus 1.

The number of writes 434 is information indicating the cumulative number of writes to a prescribed area of the toner memory 42.

(Drum Cartridge Information)

Figure 4:
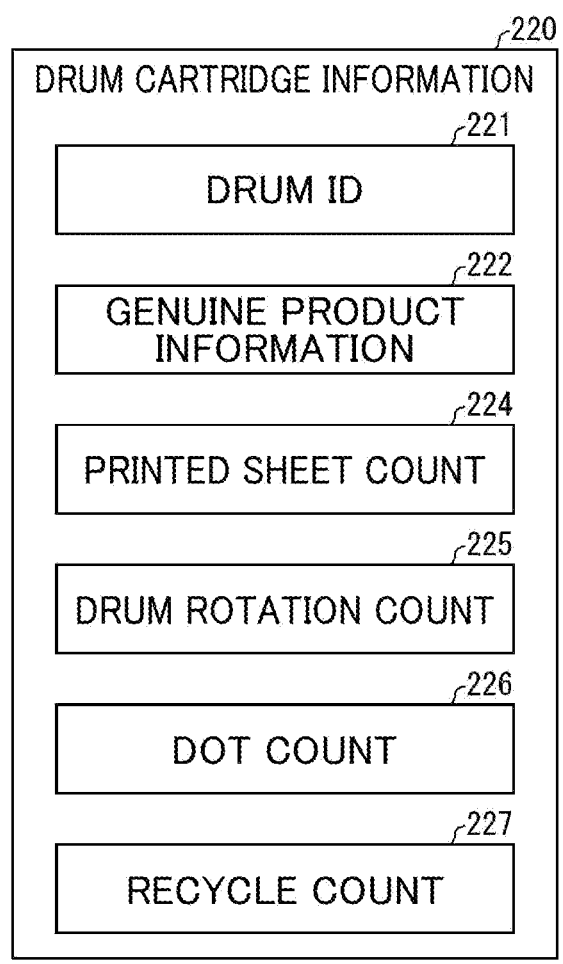
FIG. 4 is a diagram illustrating an example of the data structure of drum cartridge information stored in a drum memory.

FIG. 4 illustrates an example of the data structure of the drum cartridge information 220 stored in the drum memory 22. As one example, the drum cartridge information 220 includes a drum ID 221, genuine product information 222, usage amount information, and initialization information. The drum cartridge information 220 may include the capacity information 422, set period information 431, printable sheet count information 432, environment information 433, and number of writes 434 described in the section on the toner cartridge information.

As an example of the usage amount information, the drum cartridge information 220 of the drum cartridge 20 includes a printed sheet count 224, a drum rotation count 225, a dot count 226, and the like. As with the developing cartridge 4, the initialization information for the drum cartridge 20 is a recycle count 227, for example.

The various information described above is merely one example of the drum cartridge information 220. Other information may be added to this information, and some of the various information described above may be omitted as needed.

The drum ID 221 is identification information for uniquely identifying the drum cartridge 20. As one example, the drum ID 221 is a serial number unique to the drum cartridge 20.

The genuine product information 222 specifies whether the drum cartridge 20 is a genuine or non-genuine product. For example, the drum cartridge 20 is classified as either "genuine" or "non-genuine", and the genuine product information 222 specifies one of these classifications.

The printed sheet count 224 is information indicating the cumulative number of sheets printed by the image forming apparatus 1 using the drum cartridge 20. In other words, the printed sheet count 224 is information indicating the number of sheets of paper that have been printed on the image forming apparatus 1 since the drum cartridge 20 was attached to the image forming apparatus 1.

The drum rotation count 225 is information specifying the number of times the photosensitive drum 21 in the drum cartridge 20 has rotated due to executions of printing since the drum cartridge 20 was attached to the image forming apparatus 1.

The dot count 226 is information indicating the cumulative number of dots printed by the image forming apparatus 1 using the drum cartridge 20. In other words, this information indicates the cumulative number of dots printed in the image forming apparatus 1 since the drum cartridge 20 was attached to the image forming apparatus 1.

The recycle count 227 is information indicating the number of times at least some of the information stored in the drum memory 22 of the drum cartridge 20 has been initialized in accordance with user instructions.

Hereinafter, a description will be made of an example configuration that can suppress the number of rewrites to the consumable memory from reaching the upper limit when the consumable is refilled with printing material without replacing the consumable memory.

(Example of Memory Maps for the Toner Memory 42)

FIG. 5 illustrates an example of the memory maps used in the toner memory 42. The toner memory 42 is a consumable memory for use in the developing cartridge 4 (a consumable). FIG. 5 illustrates an example of maps M1-M4 as memory maps of the toner memory 42, but the memory maps of the toner memory 42 are not limited to the example in FIG. 5.

In FIG. 5, the toner memory 42 includes five storage areas 42A-42E. Storage area 42A is a 16-byte storage area with addresses 0x0000-0x000F. The storage area 42A is a management information area for storing management information in the maps M1-M4. Management information is used for managing the toner memory 42 and includes recycling history information indicating the recycling history of the toner memory 42. For example, the recycling history information is the recycle count 430 for the toner memory 42. In other words, the toner memory 42 stores recycling history information indicating the recycling history of the developing cartridge 4.

The management information also includes at least one of the capacity information 422, color information 423, genuine product information 424, recycle count 430, and a recycling in-progress flag, for example. The genuine product information 424 indicates whether the developing cartridge 4 is a genuine product or not. For example, a "1" value for the genuine product information 424 indicates that the developing cartridge 4 is a genuine product, and a "0" value indicates that the developing cartridge 4 is not a genuine product. The recycling in-progress flag indicates whether a recycle process for the developing cartridge 4 is currently underway. A recycle process includes various processes such as an initialization process for recycling the developing cartridge 4. The details of the recycle process will be described later. A "1" value for the recycling in-progress flag indicates that a recycle process for the developing cartridge 4 is currently underway, while a "0" value indicates that a recycle process for the developing cartridge 4 is not underway.

In this example of the maps M1-M4, the storage area 42A stores the 1-byte capacity information 422 at address 0x0000, the 1-byte color information 423 at address 0x0001, the 1-byte genuine product information 424 at address 0x0002. The storage area 42A also stores the 1-byte recycle count 430 at address 0x0003 and the 1-byte recycling in-progress flag at address 0x0004. In this case, addresses 0x0005-0x000F are unused areas.

Storage areas 42B-42E in the maps M1-M4 are each an example of the first storage area and an example of the second storage area of the present disclosure, to which usage amounts of consumables can be written. In other words, the toner memory 42 has a first storage area to which usage amounts of the developing cartridge 4 can be written, and a second storage area to which the usage amounts of the developing cartridge 4 can be written. In the toner memory 42, based on the recycling history information (the recycle count 430), one of the first storage area and second storage area can be determined as the storage area to which the usage amounts are to be written.

In a state where the developing cartridge 4 has not been recycled, the map M1 is used as the memory map for the toner memory 42. In the map M1, usage amounts are written to the storage area 42B among the storage areas 42B-42E, and information other than the usage amounts is stored in the other storage areas 42C-42E. For convenience in the following description, the storage area among the storage areas 42B-42E to which the usage amounts are written will be sometimes called a "read/write area," and each of the storage areas to which the usage amounts are not written will be sometimes called a "read only area." In the map M1, the storage area 42B is a read/write area, while the three storage areas 42C-42E are read only areas.

The usage amounts of the developing cartridge 4 (a consumable) that are written to the read/write area include at least one of the printed sheet count 426, the developing roller rotation count 427, the remaining toner amount 428, the dot count 429, and the number of memory writes, for example. The number of memory writes is the number of times data has been written to the read/write area.

Four counters (first through fourth counters) are written to the read/write area as the usage amounts, for example. More specifically, the area of 0x0010-0x0013 in the storage area 42B of the map M1 is used for storing a 32-bit first counter, the area of 0x0014-0x0017 is used for storing a 32-bit second counter, the area of 0x0018-0x001B is used for storing a 32-bit third counter, and the area of 0x001C-0x001F is used for storing a 32-bit fourth counter, for example. The first through fourth counters respectively store one of the printed sheet count 426, developing roller rotation count 427, remaining toner amount 428, and dot count 429, for example. However, the first through fourth counters are not limited to storing this information but may store other information representing usage amounts of the developing cartridge 4.

The read only areas store information related to the developing cartridge 4 other than the usage amounts. For example, the information other than the usage amounts includes at least one of the toner ID 421 identifying the developing cartridge 4, and vendor information. The vendor information is information related to the manufacturer of the developing cartridge 4 (a toner cartridge). For example, the vender information includes the name of the manufacturer. In the map M1, the storage areas 42C-42E are read only areas. As an example, the toner ID 421 is stored in the storage area 42C at addresses 0x0020-0x002F, and the vendor information for the developing cartridge 4 is stored in the storage areas 42D and 42E at addresses 0x0030-0x004F. In this example, the vendor information includes first vendor information stored in the storage area 42D and second vendor information stored in the storage area 42E.

The controller 61 sets the memory map of the toner memory 42 to one of the maps M1-M4 based on the recycle count 430. The process of determining the memory map will be described later.

Next, steps in processes executed by the controller 61 of the image forming apparatus 1 will be described with reference to flowcharts. Processes described below that are executed by the image forming apparatus 1 include a recycle preparation process, a recycle process, a toner memory update process, and a printing material amount identification process. The recycle preparation process, recycle process, toner memory update process, and printing material amount identification process are an example of a recycling method for recycling consumables according to the present disclosure.

<Recycle Preparation Process>

Figure 6:
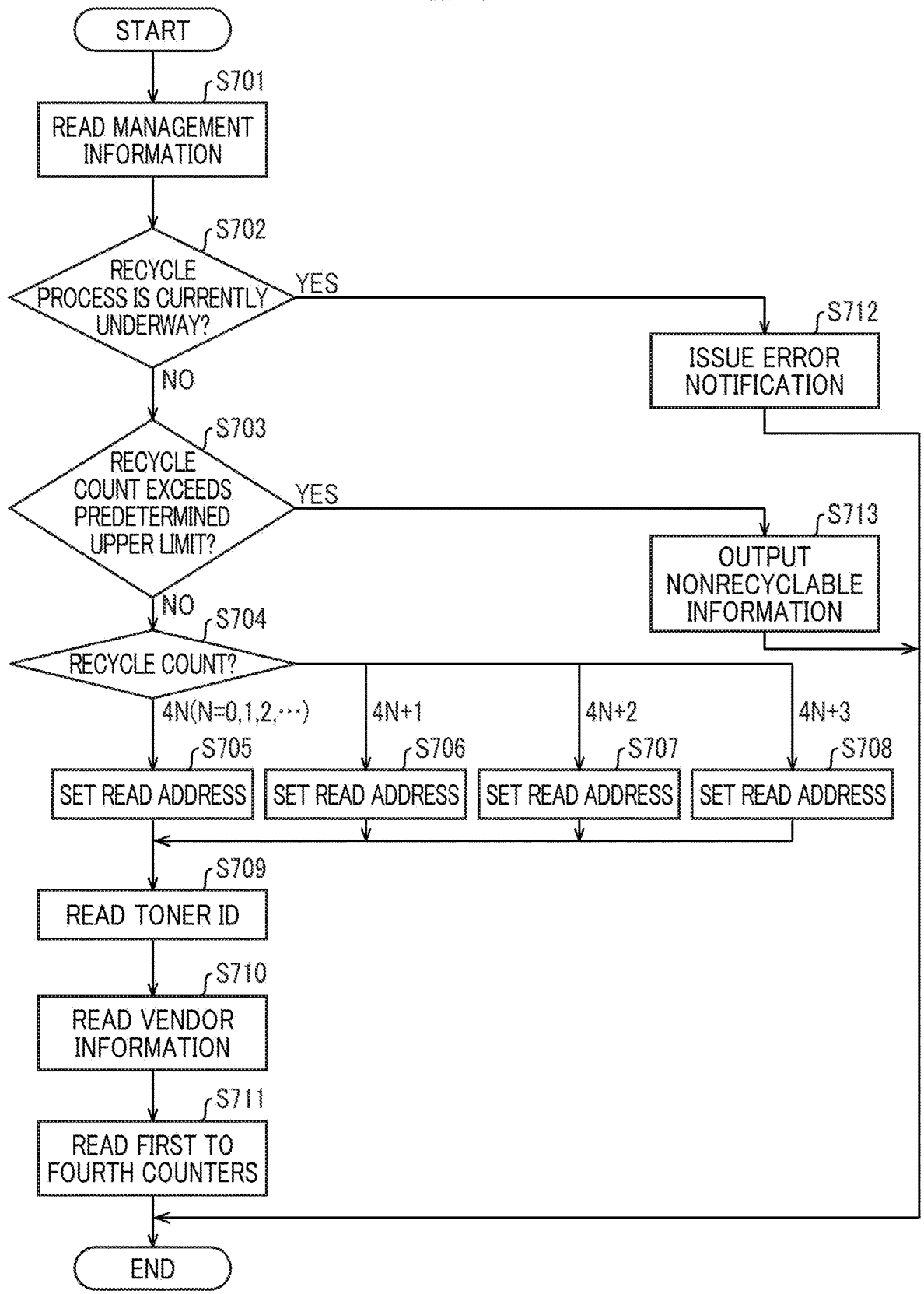
FIG. 6 is a flowchart illustrating an example of steps in a recycle preparation process executed by the image forming apparatus.

FIG. 6 is a flowchart illustrating an example of steps in the recycle preparation process executed by the image forming apparatus 1. The controller 61 executes the series of steps shown in FIG. 6. The following example describes a case of recycling the developing cartridge 4 having the memory maps illustrated in FIG. 5. For example, execution of the process in FIG. 6 is triggered by the cover 11 being opened and closed or by the power to the image forming apparatus 1 being turned on.

In step S701 the controller 61 reads the management information from the management information area of the toner memory 42. In step S702 the controller 61 references the recycling in-progress flag contained in the management information to determine whether a recycle process for the developing cartridge 4 is currently underway. When the recycling in-progress flag is "1", the controller 61 determines that a recycle process is in progress. On the other hand, when the recycling in-progress flag is "0", the controller 61 determines that a recycle process is not in progress. The controller 61 advances to the process of step S712 when determining that a recycle process is in progress and advances to the process of step S703 when determining that a recycle process is not in progress.

In step S703 the controller 61 references the recycle count 430 to determine whether the recycle count exceeds a predetermined upper limit. When the recycle count exceeds the upper limit, the controller 61 advances to the process of step S713. However, when the recycle count 430 does not exceed the upper limit, the controller 61 advances to the process of step S704.

In steps S704-S708, the controller 61 performs a determining process (the determining step) to determine one of the storage areas 42B-42E as the read/write area based on the recycle count 430 (recycling history information) updated through the recycle process described later. In this embodiment, based on the recycle count 430, the controller 61 determines the storage area 42B as the read/write area when the developing cartridge 4 has not been recycled and determines one of the storage areas 42B-42E as the read/write area when the developing cartridge 4 has been recycled.

In particular, the controller 61 in the present embodiment determines one of the storage areas 42B-42E as the storage area corresponding to the recycle count 430.

First, in step S704 the controller 61 determines whether the recycle count 430 is 4N, 4N+1, 4N+2, or 4N+3 (where N is an integer of 0 or greater). The controller 61 advances to the process of step S705 when the recycle count 430 is 4N, advances to the process of step S706 when the recycle count 430 is (4N+1), advances to the process of step S707 when the recycle count 430 is (4N+2), and advances to the process of step S708 when the recycle count 430 is (4N+3).

In this example, the memory map of the toner memory 42 is set to the map M1 when the recycle count 430 is 4N and is set to the maps M2, M3, and M4 when the recycle count 430 is (4N+1), (4N+2), and (4N+3), respectively.

When the recycle count 430 is 4N, in step S705 the controller 61 sets addresses corresponding to the map M1 as the read addresses for reading the first through fourth counters, the toner ID 421, and the vendor information. Specifically, the controller 61 assigns address 0x0010 to a pointer variable for the first counter as the read address for reading the first counter. The controller 61 also assigns address 0x0014 to a pointer variable for the second counter, assigns address 0x0018 to a pointer variable for the third counter, and assigns address 0x001C to a pointer variable for the fourth counter. The controller 61 also assigns address 0x0020 to a pointer variable for the toner ID 421. The controller 61 also assigns addresses 0x0030 and 0x0040 to a pointer variable for the first vendor information and a pointer variable for the second vendor information, respectively. After completing the process in step S705, the controller 61 advances to the process of step S709.

When the recycle count 430 is (4N+1), in step S706 the controller 61 sets addresses corresponding to the map M2 as the read addresses for reading the first through fourth counters, the toner ID 421, and the vendor information. Specifically, the controller 61 assigns address 0x0020 to the pointer variable for the first counter, assigns address 0x0024 to the pointer variable for the second counter, assigns address 0x0028 to the pointer variable for the third counter, and assigns address 0x002C to the pointer variable for the fourth counter. The controller 61 also assigns address 0x0010 to the pointer variable for the toner ID 421. The controller 61 also assigns addresses 0x0030 and 0x0040 to the pointer variable for the first vendor information and the pointer variable for the second vendor information, respectively. After completing the process in step S706, the controller 61 advances to the process of step S709.

When the recycle count 430 is (4N+2), in step S707 the controller 61 sets addresses corresponding to the map M3 as the read addresses for reading the first through fourth counters, the toner ID 421, and the vendor information. Specifically, the controller 61 assigns address 0x0030 to the pointer variable for the first counter, assigns address 0x0034 to the pointer variable for the second counter, assigns address 0x0038 to the pointer variable for the third counter, and assigns address 0x003C to the pointer variable for the fourth counter. The controller 61 also assigns address 0x0010 to the pointer variable for the toner ID 421. The controller 61 also assigns addresses 0x0020 and 0x0040 to the pointer variable for the first vendor information and the pointer variable for the second vendor information, respectively. After completing the process in step S707, the controller 61 advances to the process of step S709.

When the recycle count 430 is (4N+3), in step S708 the controller 61 sets addresses corresponding to the map M4 as the read addresses for reading the first through fourth counters, the toner ID 421, and the vendor information. Specifically, the controller 61 assigns address 0x0040 to the pointer variable for the first counter, assigns address 0x0044 to the pointer variable for the second counter, assigns address 0x0048 to the pointer variable for the third counter, and assigns address 0x004C to the pointer variable for the fourth counter. The controller 61 also assigns address 0x0010 to the pointer variable for the toner ID 421. The controller 61 also assigns addresses 0x0020 and 0x0030 to the pointer variable for the first vendor information and the pointer variable for the second vendor information, respectively. After completing the process in step S708, the controller 61 advances to the process of step S709.

In step S709 the controller 61 uses the pointer variable for the toner ID 421 set in one of steps S705-S708 to read the toner ID 421 from the read only area.

In step S710, the controller 61 uses the pointer variables for the first vendor information and second vendor information set in one of steps S705-S708 to read the vender information from the read only areas. As an example, the controller 61 reads 16 bytes of vendor information from storage areas indicated by a first address stored in the pointer variable for the first vendor information, the first address+1, the first address+2, the first address+3, a second address stored in the pointer variable for the second vendor information, the second address+2, and the second address+3.

In step S711 the controller 61 uses the pointer variables for the first through fourth counters to read the first through fourth counters from the read/write area. Through the process in steps S709-S711, the controller 61 reads information on the usage amounts and the like for the developing cartridge 4.

In step S712, the controller 61 issues an error notification. When the recycle preparation process for the developing cartridge 4 is initiated despite the recycling in-progress flag being set to "1", the controller 61 assumes that the recycle process has not been completed normally. In such cases, the controller 61 reports an error in step S712 in order that the user can know the occurrence of an abnormality.

In step S713 the controller 61 outputs nonrecyclable information indicating that the developing cartridge 4 (the consumable) cannot be recycled. In other words, the controller 61 executes an output process to output the nonrecyclable information when the recycle count 430 has reached the predetermined upper limit (step S703: YES).

<Recycle Process>

Figure 7:
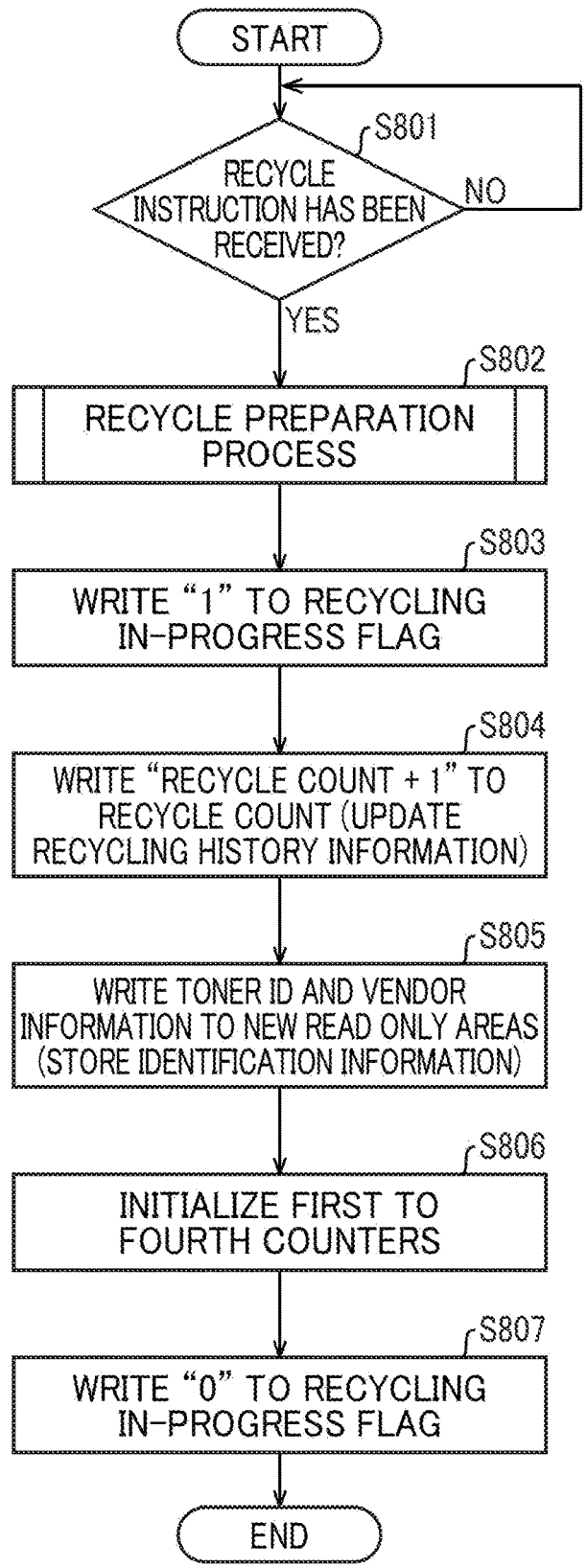
FIG. 7 is a flowchart illustrating an example of steps in a recycle process executed by the image forming apparatus.

FIG. 7 is a flowchart illustrating an example of steps in the recycle process executed by the image forming apparatus 1 for recycling the developing cartridge 4 (a consumable). The controller 61 executes the series of steps shown in FIG. 7. The following example describes a case in which the developing cartridge 4 is recycled in the recycle process.

In step S801 the controller 61 determines whether an instruction to recycle the developing cartridge 4 has been received. For example, the user inputs a recycle instruction into the image forming apparatus 1 by operating the operating unit 64 in response to a screen displayed on the display 65. When an instruction is received, the controller 61 advances to the process of step S802. However, while an instruction has not been received, the controller 61 waits until an instruction is received. Step S801 is an example of a reception process according to the present disclosure.

In step S802 the controller 61 executes the recycle preparation process shown in FIG. 6 (steps S701-S711). In step S803 the controller 61 writes a "1" to the recycling in-progress flag.

In step S804, in response to the received instruction, the controller 61 updates the recycling history information by incrementing the recycle count 430 by 1 and writing the new value to the recycle count 430. In other words, in step S804 the controller 61 stores the recycle count 430, which is used for determining one of the storage areas 42B-42E as the read/write area to which the usage amounts are to be written, in the toner memory 42.

By updating the recycle count 430, the memory map for the toner memory 42 is changed in the order of the maps M1, M2, M3, and M4 so that the read/write area and read only areas are rotated among the storage areas 42B-42E each time the recycle count 430 is updated. For example, when the memory map is the map M1 prior to the update, the memory map becomes the map M2 after the update. In this case, the read only areas are switched from the storage areas 42C, 42D, and 42E to the storage areas 42B, 42D, and 42E.

In step S805 the controller 61 writes the toner ID 421 and vendor information to the new read only areas, which correspond to the recycle count 430 updated in step S804. In other words, the controller 61 stores the toner ID and vendor information in the storage areas among the storage areas 42B-42E (read only areas) different from the storage area determined as the read/write area.

In step S806 the controller 61 initializes the first through fourth counters. That is, based on the recycle count 430 (recycling history information) updated in step S804, the controller 61 determines the read/write area to which the usage amounts are to be written and initializes this determined read/write area.

In step S807 the controller 61 writes a "0" to the recycling in-progress flag. After completing the process of step S807, the controller 61 ends the recycle process. When the recycle process does not end normally and the controller 61 does not execute step S807, the value of the recycling in-progress flag remains at "1".

Recycling operations such as refilling the developing cartridge 4 with printing material or replacing parts in the developing cartridge 4 are performed before or after the image forming apparatus 1 executes the recycle process in FIG. 7. Once the recycling operations, such as the refilling of printing material and the replacement of parts, and the recycle process performed by the image forming apparatus 1 are complete, the developing cartridge 4 can be used as a recycled product.

<Toner Memory Update Process>

Figure 8:
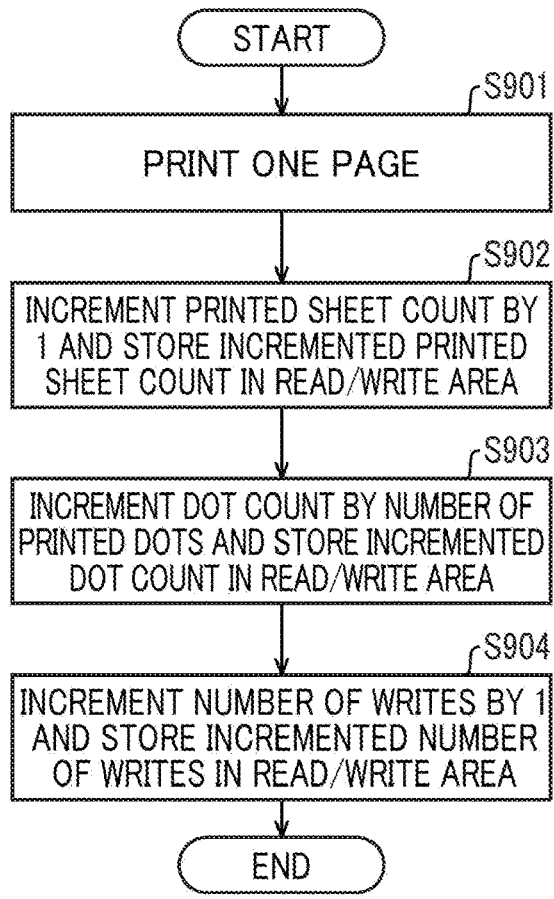
FIG. 8 is a flowchart illustrating an example of steps in a toner memory update process executed by the image forming apparatus.

FIG. 8 is a flowchart illustrating an example of steps in the toner memory update process executed by the image forming apparatus 1 for updating the toner memory 42. The controller 61 executes the series of steps shown in FIG. 8. In the example of FIG. 8, the image forming apparatus 1 performs an image forming process and updates the usage amounts stored in the toner memory 42 based on the executed image forming process. The usage amounts stored in the toner memory 42 in the example of FIG. 8 are the printed sheet count 426, the dot count 429, and the number of writes.

In step S901 the controller 61 performs a printing operation for one page. In step S902 the controller 61 increments the printed sheet count 426 stored in the read/write area of the toner memory 42 by 1 and re-stores the incremented printed sheet count 426 in the read/write area.

In step S903 the controller 61 increments the dot count 429 stored in the read/write area of the toner memory 42 by a number equivalent to the number of dots printed in the printing operation and re-stores the incremented dot count 429 in the read/write area. In step S904 the controller 61 also increments the number of writes stored in the read/write area of the toner memory 42 by 1 and re-stores the incremented number of writes in the read/write area.

In steps S902-S904 described above, the controller 61 writes the usage amounts for the developing cartridge 4 in the read/write area. The addresses used for writing are the addresses set according to the recycle count 430 in steps S705-S708 of FIG. 6 described above. Specifically, when the recycle count 430 is 4N, the read/write area is the storage area 42B, as shown in the map M1. When the recycle count 430 is (4N+1), the read/write area is the storage area 42C, as shown in the map M2. When the recycle count 430 is (4N+2), the read/write area is the storage area 42D, as shown in the map M3. When the recycle count 430 is (4N+3), the read/write area is the storage area 42E, as shown in the map M4.

In other words, when the recycle count 430 indicates that the developing cartridge 4 has not been recycled, in steps S902-S904 the controller 61 executes writing processes for writing the usage amounts of the developing cartridge 4 to the first storage area. Further, when the recycle count 430 (the recycling history information) indicates that the developing cartridge 4 (the consumable) has been recycled, the controller 61 executes writing processes to write the usage amounts to the second storage area.

In the example of FIG. 5, the read/write area is changed in the order of storage areas 42B, 42C, 42D, and 42E each time the recycle count 430 is updated. For example, when the developing cartridge 4 is recycled four times, the read/write area in the toner memory 42 is changed in the order of storage areas 42B, 42C, 42D, and 42E each time the developing cartridge 4 is recycled. Therefore, the number of times the usage amounts are rewritten to each of the storage areas 42B-42E is one-fourth compared to a configuration in which the read/write area is not changed. Thus, the present embodiment can easily suppress the number of rewrites to the toner memory 42 from reaching the upper limit when the developing cartridge 4 is refilled with printing material without replacing the toner memory 42.

<Printing Material Amount Identification Process>

Figure 9:
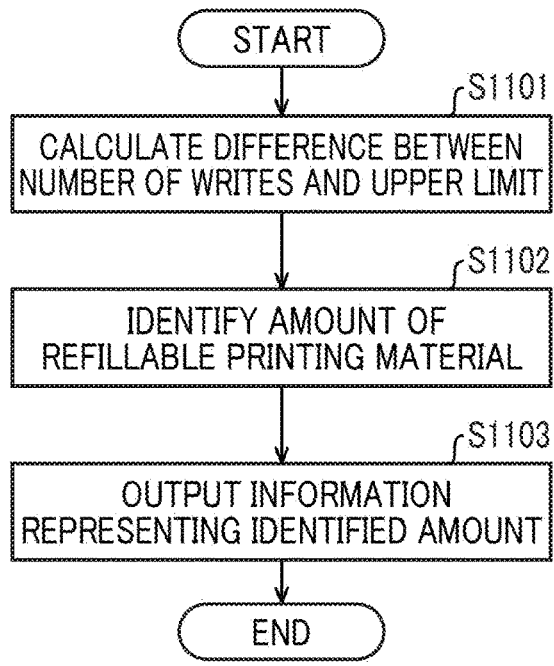
FIG. 9 is a flowchart illustrating an example of steps in a printing material amount identification process executed by the image forming apparatus.

FIG. 9 is a flowchart illustrating an example of steps in the printing material amount identification process executed by the image forming apparatus 1 during image formation to identify an amount of printing material. The controller 61 executes the series of steps shown in FIG. 9. For example, the series of steps in FIG. 9 are executed prior to recycling operations for refilling the developing cartridge 4 with printing material.

In step S1101, the controller 61 calculates the difference between the number of writes stored in the read/write area and the predetermined upper limit. In step S1102 the controller 61 identifies the amount of printing material with which the developing cartridge 4 can be refilled. In the present embodiment, based on the difference between the number of writes to the read/write area and the upper limit on the number of writes to the toner memory 42, the controller 61 identifies, as the amount of printing material with which the developing cartridge 4 can be refilled, an amount corresponding to the difference. In other words, based on at least one of a difference between the number of writes to the first storage area and the upper limit on the number of writes to the toner memory 42 and a difference between the number of writes to the second storage area and the upper limit on the number of writes to the toner memory 42, the controller 61 identifies, as the amount of printing material with which the developing cartridge 4 can be refilled, an amount corresponding to the at least one of the differences. For example, the controller 61 may identify the amount of printing material corresponding to the identified difference by referencing a table that maps capacity types of the developing cartridge 4 for accommodating printing material (small capacity, standard capacity, large capacity, etc.) to ranges of differences between the number of writes and the upper limit. As another example, the controller 61 may identify the amount of printing material with which the developing cartridge 4 can be refilled by executing the process of steps S304-S309 in FIG. 13 of a second embodiment described later.

In step S1103 the controller 61 outputs information representing the amount identified in S1102. For example, the controller 61 outputs information representing the identified amount by displaying the information on the display 65.

<Effects of the Present Embodiment>

According to the embodiment described above, the toner memory 42, which is a consumable memory, includes the first storage area and second storage area to which the usage amounts can be written. Based on the recycle count 430 (the recycling history information), the image forming apparatus 1 determines the storage area to which the usage amounts are to be written. Since the storage area to which the usage amounts of the developing cartridge 4 are written changes according to the recycle count 430, the number of writes to each storage area is less than a configuration in which the storage area to which the usage amounts are written is not changed. This configuration can provide the image forming apparatus 1 that can suppress the number of rewrites to the toner memory 42 from reaching the upper limit when the developing cartridge 4 is refilled with printing material without replacing the toner memory 42.

According to the present embodiment, depending on whether the developing cartridge 4 is a recycled cartridge, the image forming apparatus 1 determines different storage areas as the storage area to which the usage amounts are to be written. This configuration can reduce the number of writes to each storage area compared to a configuration in which the storage area to which the usage amounts are to be written is not changed according to whether the developing cartridge 4 has been recycled.

According to the present embodiment, the usage amounts are written to the first storage area when the developing cartridge 4 is not a recycled cartridge. This configuration can reduce the number of writes to each storage area compared to a configuration in which the writing area is not changed according to the recycle count 430.

According to the present embodiment, the usage amounts are written to the second storage area when the developing cartridge 4 is a recycled cartridge. This configuration can reduce the number of writes to each storage area compared to a configuration in which the writing area is not changed according to the recycling history information.

According to the present embodiment, in a case where the developing cartridge 4 is recycled a plurality of times, the number of times the usage amounts are written are distributed among a plurality of storage areas by changing the storage area to which the usage amounts are written according to the recycle count. This configuration can reduce the number of writes to each storage area compared to a configuration in which the storage area for writing the usage amounts is not varied according to the recycle count, even when the developing cartridge 4 is recycled a plurality of times.

According to the present embodiment, the recycling history information is updated when the developing cartridge 4 is recycled. By determining the storage area to which the usage amounts are written based on the recycling history information, the image forming apparatus 1 can distribute the number of writes among a plurality of storage areas.

According to the present embodiment, the toner ID identifying the developing cartridge 4 and the vendor information are stored in read only areas different from the read/write area. The toner ID and vendor information are not updated as image forming processes are performed. Accordingly, the number of writes to read only areas in which the toner ID and vendor information are stored do not increase as image forming processes are executed. This configuration can reduce the number of writes to each storage area and effectively utilize the read only areas other than the read/write area.

According to the present embodiment, the storage area to which the usage amounts of the developing cartridge 4 are to be written is initialized when the developing cartridge 4 is recycled. This configuration can suppress the usage amounts of the developing cartridge 4 stored in the toner memory 42 from becoming inconsistent with the actual values due to recycling.

The present embodiment can provide the image forming apparatus 1 that enables recycling in which the number of times the printed sheet count information or the dot count information is rewritten to the toner memory 42 does not reach the upper limit.

The present embodiment can provide the image forming apparatus that enables recycling in which the number of times the usage amount of printing material in the developing cartridge 4 after recycling is rewritten to the toner memory 42 does not reach the upper limit.

According to the present embodiment, the controller 61 outputs nonrecyclable information when the recycle count exceeds the upper limit count. This ensures that the user knows when recycling is no longer possible.

According to the present embodiment, the amount of printing material with which the developing cartridge 4 can be refilled is identified based on the number of writes to the toner memory 42. In this way, the toner memory 42 can continue to be used until the number of writes to the toner memory 42 have reached the upper limit.

According to the present embodiment, the user can input a recycling instruction via the operating unit 64 provided in the image forming apparatus 1.

According to the present embodiment, the toner memory 42 includes the first storage area and the second storage area to which the usage amounts can be written. Since the storage area to which the usage amounts of the consumable are written changes according to the recycling history information, the number of writes to each storage area is less than a configuration in which the writing area is not changed. This configuration can suppress the number of rewrites to the toner memory 42 from reaching the upper limit when the developing cartridge 4 is refilled with printing material without replacing the toner memory 42.

According to the present embodiment, the toner memory 42 includes the first storage area and the second storage area to which the usage amounts can be written. The recycling method includes storing the recycling history information, which is used for determining which to use the first storage area or the second storage area as the storage area to which the usage amounts are to be written, in the consumable memory. Since the storage area to which the usage amounts of the developing cartridge 4 are written changes according to the recycle count 430, the number of writes to each storage area is less than a configuration in which the storage area for writing the usage amounts is not changed. This configuration can suppress the number of rewrites to the toner memory 42 from reaching the upper limit when the consumable is refilled with printing material without replacing the toner memory 42.

(First Variation)

The above first embodiment describes a case where the image forming apparatus 1 to which the consumables (the developing cartridges 4) are attached executes the recycle process (recycling method) shown in FIG. 7. The consumable recycling method according to the present disclosure may be performed by the image forming apparatus 1 or by a device other than the image forming apparatus 1. For example, a dedicated device for recycling consumables may perform the recycling method according to the present disclosure. An example of the dedicated device may be a jig used for recycling toner cartridges or other consumables. In a case where a device other than the image forming apparatus 1 performs the recycling method according to the present disclosure, the reception process shown in step S801 of FIG. 7 for receiving a recycle instruction may be omitted.

(Second Variation)

In the first embodiment described above, the recycle count 430 is used as the recycling history information indicating the recycling history of the consumable, but the recycling history information is not limited to the recycle count 430 and may be other information. As an example, the recycling history information may be a flag indicating whether the consumable has been recycled.

(Third Variation)

The first embodiment described above gives an example of the toner memory 42 having the four storage areas 42B-42E as the areas to which the usage amounts can be written, but the number of storage areas provided in the toner memory 42 to which the usage amounts can be written may be more or less than four.

(Fourth Variation)

The image forming apparatus 1 may be an inkjet printer. In a case where the image forming apparatus 1 is an inkjet printer, ink cartridges are attached to the cartridge holding parts 13 of the image forming apparatus 1 instead of the drum cartridges 20 and developing cartridges 4 described in the first embodiment. Note that there is no particular restriction on the number of ink cartridges attached to the image forming apparatus 1. For example, a total of four ink cartridges corresponding to the four colors cyan, magenta, yellow, and black may be attached to the image forming apparatus 1, or only a single ink cartridge for the single color black may be attached to the image forming apparatus 1.

Each ink cartridge includes a cartridge body that is filled with ink, as the printing material, and an ink memory storing ink cartridge information. The ink cartridge information includes an ink ID, capacity information, color information, genuine product information, upper limit information, a printed sheet count, a remaining ink amount, a recycle count, set period information, printable sheet count information, environment information, and the number of writes, for example.

The ink ID is identification information for the ink cartridge and is included in the ink cartridge information in place of the toner ID 421 in the first embodiment. The remaining ink amount is information specifying the remaining amount of ink in the ink cartridge and is included in the ink cartridge information in place of the remaining toner amount 428 of the first embodiment. The capacity information, the color information, the genuine product information, the upper limit information, the printed sheet count, the recycle count, the set period information, the printable sheet count information, the environment information, and the number of writes each corresponds to information of the same name in the toner cartridge information 420 of the first embodiment, wherein the terms "toner" and "toner cartridge" in the toner cartridge information 420 are replaced with "ink" and "ink cartridge", respectively.

The flow of steps shown in each flowchart described in the first embodiment is the same when the image forming apparatus 1 is an inkjet printer. Specifically, in a case where the image forming apparatus 1 is an inkjet printer, the terms "developing cartridge 4", "toner memory 42", and "toner cartridge information 420" in the first embodiment should be read as "ink cartridge", "ink memory", and "ink cartridge information", respectively. Further, the various information included in the toner cartridge information 420 of the first embodiment should be replaced by corresponding information in the ink cartridge information. Since the developing roller rotation count 427 is not included in the ink cartridge information, the image forming apparatus 1 may omit all processes related to the developing roller rotation count 427 in this variation. The image forming apparatus 1 of this variation obtains the same effects as the image forming apparatus 1 in the first embodiment.

(Fifth Variation)

The image forming apparatus 1 may also be a multifunction printer (MFP) possessing other functions besides a printing function, such as a scanner or a facsimile machine. Even in a case where the image forming apparatus 1 is an MFP, the image forming apparatus 1 may perform the same processes described in the first embodiment in the same manner as the image forming apparatus 1 according to the first embodiment. The image forming apparatus 1 of this variation obtains the same effects as the image forming apparatus 1 in the first embodiment.

Second Embodiment

Next, another embodiment of the present disclosure will be described. For convenience of description, members having the same functions as members described in the above embodiment are designated with the same reference numerals to avoid duplicating description.

The following is a description of a sample configuration that enables a consumable memory to continue to be used until the number of writes to the consumable memory reaches an upper limit in a case where the consumable is refilled with toner or other printing material without replacing the consumable memory.

(Example of Memory Map for Toner Memory 42)

Figures 10, 11:
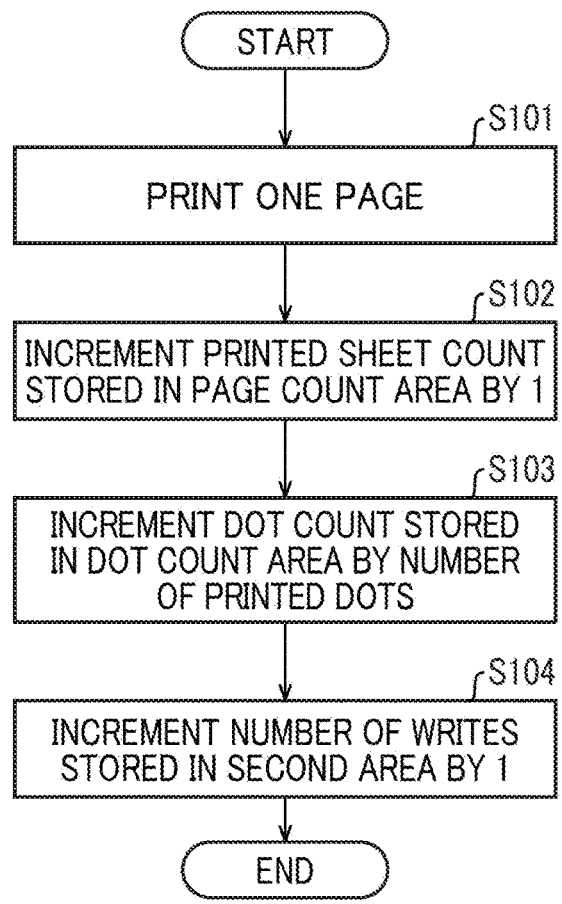
FIG. 10 is a diagram illustrating an example of a memory map used in a toner memory.
FIG. 11 is a flowchart illustrating steps in a process executed by a controller during a print.

FIG. 10 illustrates an example of a memory map for the toner memory 42. The toner memory 42 has a management information area 42F, a first area 42G, a second area 42I, a third area 42H, and a fourth area 42J.

The management information area 42F is an area in which information related to the developing cartridge 4 (the toner cartridge) can be stored. For example, in the management information area 42F of the present embodiment, the capacity information 422 indicating "small capacity", "standard capacity", or "large capacity" is stored at address 0x0000. The color information 423 indicating "cyan (C)", "magenta (M)", "yellow (Y)", or "black (BK)" is stored at address 0x0001; the genuine product information 424 specifying "genuine" or "non-genuine" is stored at address 0x0002; the recycle count 430 is stored at address 0x0003; and addresses 0x0004-0x000F are unused areas or store other information.

The first area 42G is an area in which information related to the developing cartridge 4 (the toner cartridge) can be stored. For example, in the first area 42G in the present embodiment, addresses 0x0010-0x0013 are a page count area for storing the printed sheet count 426; addresses 0x0014-0x0017 are a dot count area for storing the dot count 429; addresses 0x0018-0x001B are a developing roller count area for storing the developing roller rotation count 427; and addresses 0x001C-0x001F may be an unused area.

The second area 42I is an area in which the number of writes to the first area 42G is stored.

The third area 42H is an area in which various information related to the image forming apparatus 1 can be stored. For example, in the third area 42H of the present embodiment, addresses 0x0020-0x0021 store measurement results of the density sensor; addresses 0x0022-0x0023 store the developing bias applied to the developing roller during the most recent print; address 0x0024 stores the ambient temperature; and address 0x0025 stores the ambient humidity. The ambient temperature and ambient humidity are each an example of the environment information 433 in the present disclosure.

The fourth area 42J is an area in which the number of writes to the third area 42H is stored.

Next, the steps in the processes executed by the controller 61 of the image forming apparatus 1 will be described with reference to flowcharts.

<Process for Printing>

FIG. 11 is a flowchart illustrating steps in the process executed by the controller 61 during a print. The process shown in FIG. 11 will be described using the example of the controller 61 executing the process for the toner memory 42. However, the controller 61 can also execute the process shown in FIG. 11 for the drum memory 22.

The controller 61 starts a print upon receiving a print instruction via the display 65. In step S101 the controller 61 executes printing for one page and in step S102 increments the value of the printed sheet count 426 stored in the page count area of the toner memory 42 by 1. In step S103 the controller 61 also adds the number of dots used for printing the single page to the value of the dot count 429 stored in the dot count area of the toner memory 42. The controller 61 may execute the processes in steps S102 and S103 in parallel or may execute the process of step S102 after the process of step S103.

In other words, each time the image forming apparatus 1 has performed printing for one page, the controller 61 stores the printed sheet count 426 and dot count 429 in the first area 42G.

In step S104 the controller 61 increments the number of writes stored in the second area 42I of the toner memory 42 by 1. That is, in the present embodiment, when the values of the printed sheet count 426 and dot count 429 are updated in the toner memory 42, the controller 61 increments the number of writes stored in the second area 42I by 1. In other words, each time performing printing for one page, the controller 61 updates the values of the printed sheet count 426 and dot count 429 and increments the number of writes stored in the second area 42I by 1.

<Process for Measuring Ambient Temperature>

Figure 12:
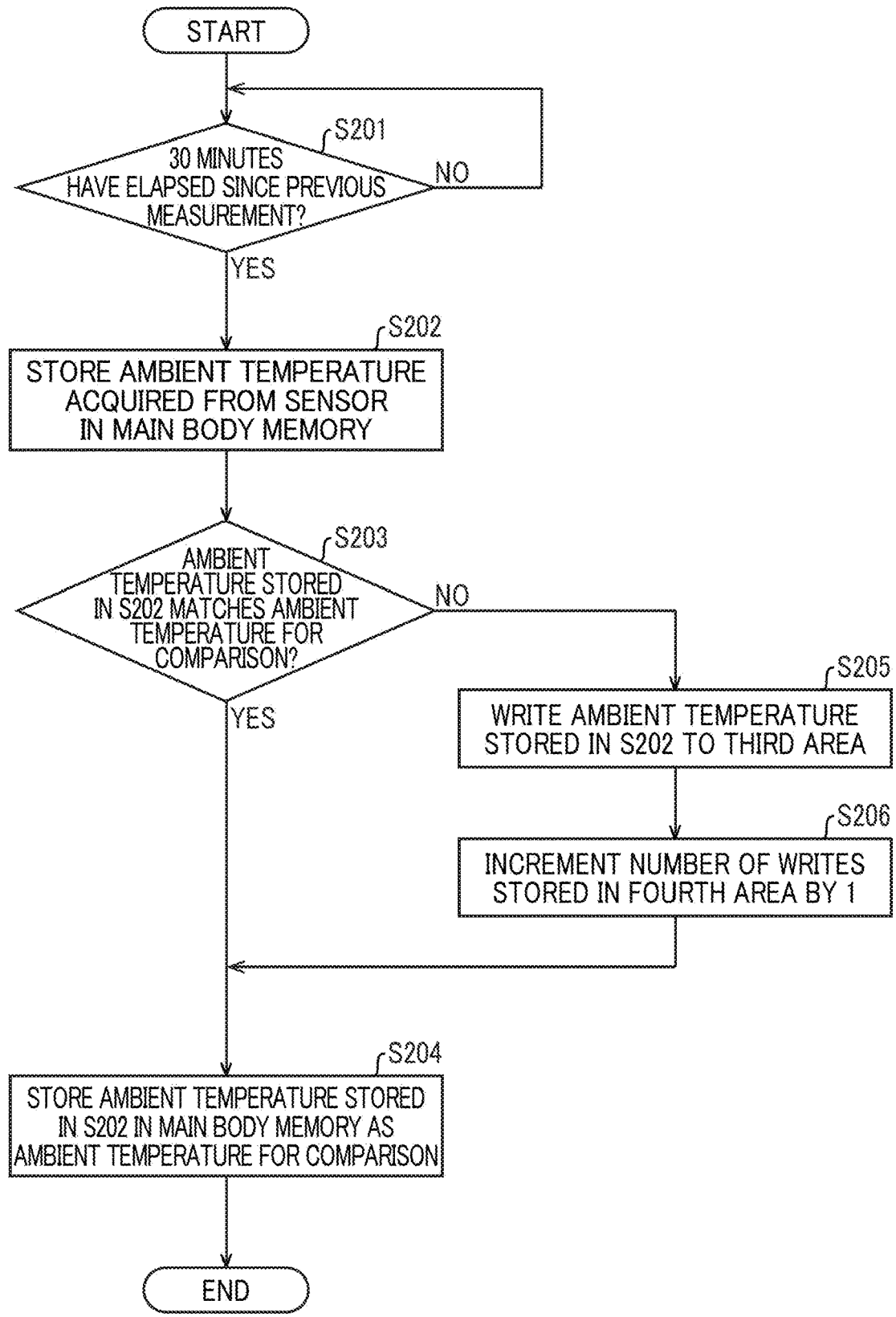
FIG. 12 is a flowchart illustrating steps in a process executed by the controller for measuring ambient temperature.

FIG. 12 is a flowchart illustrating steps in a process executed by the controller 61 for measuring ambient temperature. A description of the process shown in FIG. 12 will be made using the example process that the controller 61 executes when acquiring the ambient temperature from the temperature and humidity sensor 66. However, the controller 61 may execute the process shown in FIG. 12 when acquiring the ambient humidity from the temperature and humidity sensor 66. Moreover, the following description of the process in FIG. 12 will assume the consumable memory referenced by the controller 61 is the toner memory 42, but the consumable memory referenced by the controller 61 may be the drum memory 22.

The temperature and humidity sensor 66 periodically measures the ambient temperature. The ambient temperature is an example of the environment information 433. In the present embodiment, the temperature and humidity sensor 66 measures the ambient temperature once every 30 minutes. Therefore, the controller 61 obtains the ambient temperature from the temperature and humidity sensor 66 once every 30 minutes. In step S201 the controller 61 determines whether 30 minutes have elapsed since the last measurement of ambient temperature by the temperature and humidity sensor 66. For example, the controller 61 makes this determination by starting a timer from the time of acquiring the ambient temperature.

When the controller 61 determines that 30 minutes have not elapsed since the last measurement of ambient temperature, the controller 61 follows the NO branch of step S201 and repeats the process of step S201. On the other hand, when the controller 61 determines that 30 minutes have elapsed since the last measurement of ambient temperature, the controller 61 proceeds along the YES branch of step S201 to the process of step S202.

In step S202 the controller 61 controls the temperature and humidity sensor 66 to measure the ambient temperature. The temperature and humidity sensor 66 transmits the measured ambient temperature to the controller 61. The controller 61 stores the ambient temperature acquired from the temperature and humidity sensor 66 in the main body memory 62.

In step S203 the controller 61 determines whether the ambient temperature stored in the main body memory 62 in step S202 matches an ambient temperature for comparison stored in the main body memory 62. The ambient temperature for comparison may be the ambient temperature previously measured by the temperature and humidity sensor 66. The ambient temperature currently acquired by the controller 61 and the ambient temperature for comparison may be stored in separate areas of the main body memory 62. When the controller 61 determines that the ambient temperature stored in the main body memory 62 in step S202 matches the ambient temperature for comparison, the controller 61 proceeds along the YES branch of step S203 to the process of step S204.

In step S204 the controller 61 stores the ambient temperature stored in the main body memory 62 in step S202 in the main body memory 62 as the ambient temperature for comparison. In other words, the controller 61 overwrites the ambient temperature for comparison stored in the main body memory 62 with the currently acquired ambient temperature.

When the controller 61 determines in step S203 that the ambient temperature stored in the main body memory 62 in step 202 does not match the ambient temperature for comparison, the controller 61 proceeds along the NO branch of step S203 to the process of step S205. In step S205 the controller 61 writes the ambient temperature stored in the main body memory 62 in step S202 to the third area 42H of the toner memory 42. In other words, when the ambient temperature newly acquired by the temperature and humidity sensor 66 differs from the ambient temperature previously acquired by the temperature and humidity sensor 66, the controller 61 writes the newly acquired ambient temperature to the third area 42H. This configuration can reduce the number of writes to the third area 42H.

In step S206 the controller 61 increments the number of writes stored in the fourth area 42J of the toner memory 42 by 1. In other words, in the present embodiment, when the ambient temperature stored in the third area 42H of the toner memory 42 is updated, the controller 61 increments the number of writes stored in the fourth area 42J by 1.

<Process for Determining Recyclability>

Figure 13:
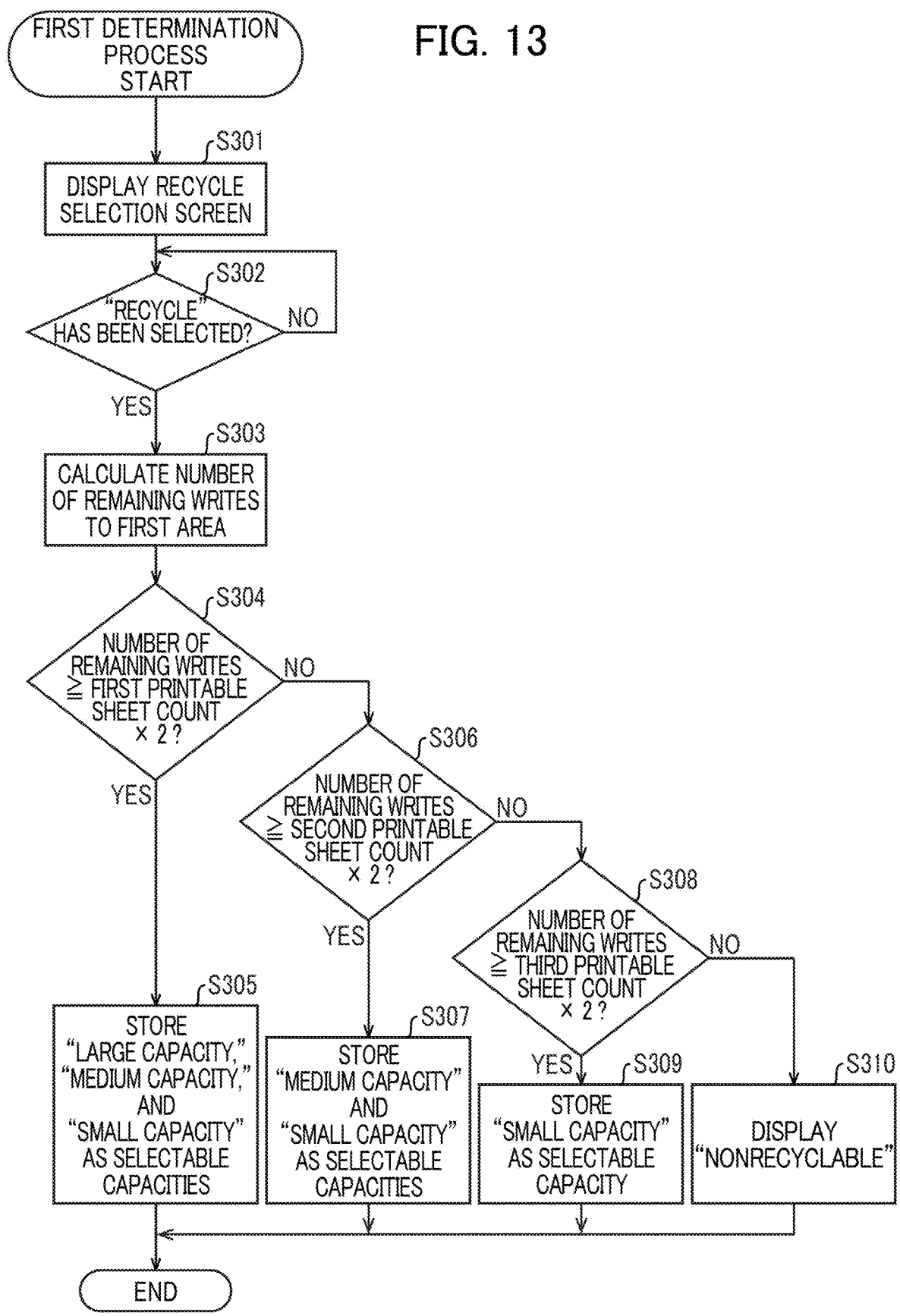
FIG. 13 is a flowchart illustrating steps in a process executed by the controller for determining recyclability.

FIG. 13 is a flowchart illustrating steps in a process executed by the controller 61 for determining recyclability.

In step S301 the controller 61 displays a recycle selection screen on the display 65. The recycle selection screen includes a user interface component (hereinafter referred to as a "UI component") prompting the user to select whether to recycle the cartridge, for example. As an example, the UI component is configured of a button corresponding to the option "Recycle", which signifies the user's desire to recycle the cartridge, and a button corresponding to the option "Do not recycle", which signifies the user's desire not to recycle the cartridge.

In step S302 the controller 61 determines which of the buttons of the UI component has been selected in the recycle selection screen. When the controller 61 determines that the "Recycle" button has been selected, the controller 61 proceeds along the YES branch of step S302 to the process of step S303. When the controller 61 determines that the "Do not recycle" button has been selected, the controller 61 proceeds along the NO branch of step S302 and ends the process. From the NO branch in step S302, the controller 61 may also return to step S301 and redisplay the recycle selection screen on the display 65.

In step S303 the controller 61 reads the upper limit information 425 from the toner memory 42. The controller 61 also reads the number of writes to the first area 42G of the toner memory 42 from the second area 42I of the toner memory 42. The number of writes to the first area 42G is an example of the number of writes 434 according to the present disclosure. The controller 61 then performs a calculation process to calculate the number of remaining writes to the first area 42G based on the upper limit information 425 and the current number of writes to the first area 42G that have been read from the toner memory 42. In the present embodiment, the controller 61 calculates the number of remaining writes to the first area 42G by subtracting the number of writes of the first area 42G from the upper limit information 425.

After the process in step S303, the controller 61 reads the printable sheet count information 432 associated with the capacity information 422 from the toner memory 42. The controller 61 then determines whether the developing cartridge 4 can be recycled based on the number of remaining writes calculated in step S303 and the printable sheet count information 432 read from the toner memory 42. With the above configuration, the controller 61 can determine whether the developing cartridge 4 can be recycled based on the number of remaining writes to reach the upper limit and the number of printable sheets corresponding to the refillable amount of printing material.

In the present embodiment, the controller 61 determines whether the developing cartridge 4 can be recycled based on the number of printable sheets associated with each of the capacity information 422 specifying a large capacity, the capacity information 422 specifying a medium capacity, and the capacity information 422 specifying a small capacity. Hereinafter, the number of printable sheets associated with the capacity information 422 specifying a large capacity will be called a "first number of printable sheets", the number of printable sheets associated with the capacity information 422 specifying a medium capacity will be called a "second number of printable sheets", and the number of printable sheets associated with the capacity information 422 specifying a small capacity will be called a "third number of printable sheets".

Specifically, in step S304 the controller 61 determines whether the number of remaining writes is greater than or equal to two times (twice) the first number of printable sheets. The process of step S304 is an example of the first determination process for determining whether the developing cartridge 4 can be recycled.

When the controller 61 determines that the number of remaining writes is two times the first number of printable sheets or more, the controller 61 determines that the developing cartridge 4 can be recycled and proceeds along the YES branch of step S304 to the process of step S305. In step S305 the controller 61 stores information in the main body memory 62 specifying the large capacity, medium capacity, and small capacity as selectable capacities that the user can select as the capacity information 422.

When the controller 61 determines that the number of remaining writes is less than two times the first number of printable sheets, the controller 61 proceeds along the NO branch of step S304 to the process of step S306. In step S306 the controller 61 determines whether the number of remaining writes is greater than or equal to two times the second number of printable sheets. The process of step S306 is an example of the first determination process for determining whether the developing cartridge 4 can be recycled. That is, when the controller 61 determines that the developing cartridge 4 cannot be recycled in the first determination process using the capacity information 422 indicating a large capacity, in step S306 the controller 61 re-executes the first determination process using the capacity information 422 indicating a medium capacity.

When the controller 61 determines that recycling is not possible at a large capacity, the controller 61 can make a determination as to whether recycling is possible at a smaller capacity than this. In this way, a capacity corresponding to the number of remaining writes to the consumable memory can be selected as the capacity of the cartridge after recycling. This allows the consumable to be recycled while effectively utilizing the lifetime of the consumable memory. The capacity information 422 indicating a large capacity is an example of the first capacity information, and the capacity information 422 indicating a medium capacity is an example of the second capacity information.

When the controller 61 determines that the number of remaining writes is two times the second number of printable sheets or more, the controller 61 proceeds along the YES branch of step S306 to the process of step S307. In step S307 the controller 61 stores information indicating a medium capacity and small capacity in the main body memory 62 as selectable capacities that the user can select as the capacity information 422 of the developing cartridge 4 being recycled.

When the controller 61 determines that the number of remaining writes is less than two times the second number of printable sheets, the controller 61 proceeds along the NO branch of step S306 to the process of step S308. In step S308 the controller 61 determines whether the number of remaining writes is greater than or equal to two times the third number of printable sheets. The process in step S308 is an example of the first determination process for determining whether the developing cartridge 4 can be recycled. In other words, when the controller 61 determines that the developing cartridge 4 cannot be recycled in the first determination process using the capacity information 422 indicating a medium capacity, in S308 the controller 61 re-executes the first determination process using the capacity information 422 specifying a small capacity. The capacity information 422 indicating a medium capacity is an example of the first capacity information, and the capacity information 422 indicating a small capacity is an example of the second capacity information.

When the controller 61 determines that the number of remaining writes is two times the third number of printable sheets or more, the controller 61 proceeds along the YES branch of step S308 to the process of S309. In step S309 the controller 61 stores information indicating a small capacity in the main body memory 62 as the selectable capacity that the user can select as the capacity information 422 for the developing cartridge 4 being recycled.

When the controller 61 determines that the number of remaining writes is less than two times the third number of printable sheets, the controller 61 proceeds along the NO branch of step S308 to the process of step S310. In step S310 the controller 61 displays an image on the display 65 specifying that the developing cartridge 4 is not recyclable. The controller 61 then ends the process for determining recyclability.

Thus, in steps S304, S306, and S308 the controller 61 executes the first determination process based on the upper limit on the number of writes, the number of writes to the first area 42G, and the capacity information 422 to determine whether the developing cartridge 4 can be recycled.

The image forming apparatus 1 has the second area 42I that stores the number of writes to the first area 42G. Therefore, when the developing cartridge 4 is to be recycled, the controller 61 can determine whether the developing cartridge 4 can be recycled based on the upper limit information 425, the number of writs to the first area 42G, and the capacity information 422. This enables the consumable memory to continue to be used until the number of writes to the toner memory 42 reaches the upper limit in a case where the developing cartridge 4 is refilled with toner while the toner memory 42 is not replaced.

The controller 61 ends the first determination process after completing step S305, S307, or S309.

The process in steps S301 and S302 is an example of the reception process to receive an instruction to recycle the developing cartridge 4 in accordance with the present disclosure. The controller 61 executes the first determination process in response to the received instruction. In this case, the controller 61 receives an instruction to recycle the developing cartridge 4 via the display 65 in the reception process.

Further, while the threshold for comparing the number of remaining writes in steps S304, S306, and S308 is set to two times the number of printable sheets, the threshold for comparing the number of remaining writes may be set to any value greater than or equal to the number of printable sheets.

<Another Process for Determining Recyclability>

Figure 14:
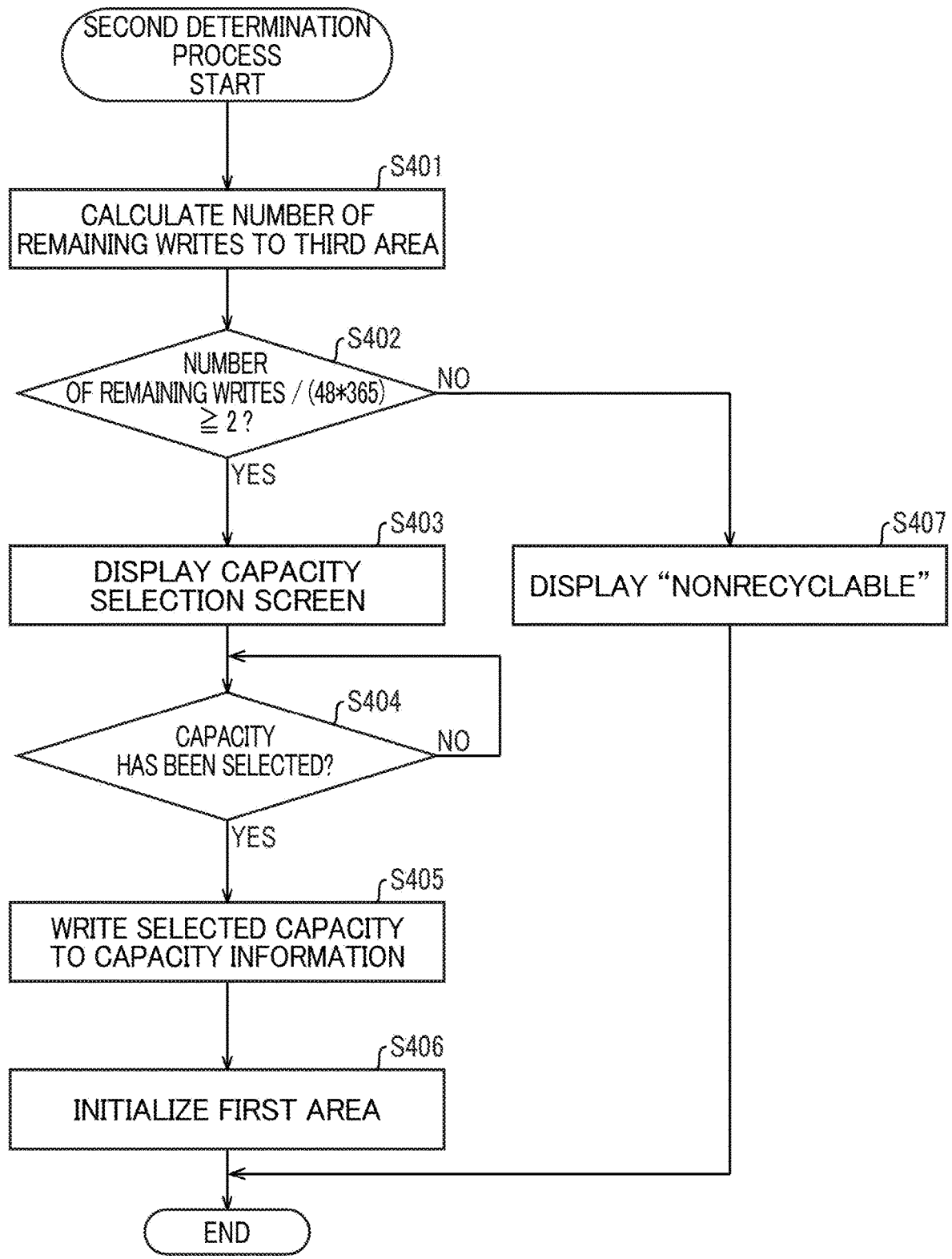
FIG. 14 is a flowchart illustrating steps in another process executed by the controller for determining recyclability.

FIG. 14 is a flowchart illustrating steps in another process executed by the controller 61 for determining recyclability. In the present embodiment, the controller 61 executes the process in FIG. 14 after the process described in FIG. 13.

In step S401 the controller 61 reads the upper limit information 425 from the toner memory 42. The controller 61 also reads the number of writes to the third area 42H of the toner memory 42 from the fourth area 42J of the toner memory 42. The number of writes to the third area 42H is an example of the number of writes 434 according to the present disclosure. Next, the controller 61 calculates the number of remaining writes to the third area 42H based on the upper limit information 425 and the number of writes to the third area 42H that have been read from the toner memory 42. In the present embodiment, the controller 61 calculates the number of remaining writes to the third area 42H by subtracting the number of writes to the third area 42H from the upper limit on the number of writes.

In S402 the controller 61 reads the set period information 431 from the toner memory 42. The controller 61 then determines a specific value obtained by dividing the number of remaining writes calculated in step S401 by the maximum number of writes to the third area 42H per year and determines whether this specific value is greater than or equal to the value specified by the set period information 431. In other words, the controller 61 executes a second determination process to determine whether the developing cartridge 4 can be recycled based on the upper limit on the number of writes, the number of writes to the third area 42H, and the set period information 431 for the developing cartridge 4.

The image forming apparatus 1 has the fourth area 42J. Accordingly, the controller 61 can count the number of writes to the third area 42H, which stores therein information periodically acquired. Thus, the number of writes, which is consumed over time, can be counted. Further, when the developing cartridge 4 is recycled, the controller 61 can determine whether the developing cartridge 4 is recyclable considering the guarantee period that has been set for the developing cartridge 4.

In the present embodiment, the temperature and humidity sensor 66 measures ambient temperature every 30 minutes. Hence, the temperature and humidity sensor 66 measures the ambient temperature 48 times per day. Therefore, the controller 61 may write the ambient temperature to the third area 42H a maximum of 48 times per day. In other words, the controller 61 may write ambient temperature to the third area 42H a maximum of 48×365 times per year. Further, the set period for the developing cartridge 4 in the present embodiment is set to two years, i.e., the set period information 431 indicates a value of 2. In step S402 of the present embodiment, the controller 61 determines whether the ambient temperature can be written to the third area 42H for at least the set period, which is two years, even if the ambient temperature is written the maximum number of times per year. The two-year threshold is merely an example, and the threshold should be set in consideration for usage conditions of the developing cartridge 4 and the like.

When the controller 61 determines that the specific value is greater than or equal to two, the controller 61 proceeds along the YES branch of step S402 to the process of step S403. In step S403 the controller 61 displays a capacity selection screen on the display 65.

The capacity selection screen includes a UI component prompting the user to select a capacity for the developing cartridge 4 after recycling. The capacity selection screen displays the selectable capacity(ies) stored by the controller 61 in the main body memory 62 in step S305, S307, or S309 of FIG. 13. When the selectable capacities are stored in step S305, for example, the capacity selection screen displays the large capacity, medium capacity, and small capacity as selectable capacities for the developing cartridge 4 after recycling. When the selectable capacities are stored in step S307, the capacity selection screen displays the medium capacity and small capacity as selectable capacities for the developing cartridge 4 after recycling. When the selectable capacity is stored in step S309, the capacity selection screen displays the small capacity as the selectable capacity for the developing cartridge 4 after recycling. Through the capacity selection screen, the user can select a capacity for the developing cartridge 4 after recycling.

In step S404 the controller 61 determines whether the user has selected a capacity via the capacity selection screen. When the controller 61 determines that the user has not selected a capacity, the controller 61 proceeds along the NO branch of step S404 and repeats the process in step S404. However, when the controller 61 determines that the user has selected a capacity, the controller 61 proceeds along the YES branch of step S404 to the process of step S405.

In step S405 the controller 61 writes the user-selected capacity to the toner memory 42 as the capacity information 422. In this way, the capacity information 422 for the developing cartridge 4 after recycling is set to the user-selected capacity. After the capacity information 422 has been written, in step S406 the controller 61 initializes the information stored in the first area 42G. For example, the controller 61 initializes the printed sheet count 426, developing roller rotation count 427, and dot count 429. Subsequently, the controller 61 ends the process for determining recyclability.

Further, when the controller 61 determines in step S402 that the specific value is less than 2, the controller 61 proceeds along the NO branch of step S402 to the process of step S407. In step S407 the controller 61 displays an image on the display 65 indicating that the developing cartridge 4 is not recyclable. Subsequently, the controller 61 ends the process for determining recyclability.

(Sixth Variation)

In the second embodiment, control performed by the controller 61 possessed by the image forming apparatus 1 has been described. However, control by the controller 61 may be realized with an IC chip possessed by the developing cartridge 4. The IC chip is an example of the controller according to the present disclosure.

In this case, the address of the first area 42G is set as a specific area at the time of factory shipment. When some type of write command to the toner memory 42 is issued, the IC chip determines whether the writing area specified in the write command is within the specific area. When the write area specified by the write command falls within the specific area, the IC chip increments the number of writes stored in the second area 42I by 1.

[Implementation Through Software]

The functions of the image forming apparatus 1 can be implemented by a program that controls a computer to function as the image forming apparatus 1 and that controls the computer to function as the controller 61 of the image forming apparatus 1.

In this case, the image forming apparatus 1 includes, as a hardware for executing the program, a computer possessing at least one control device (e.g., a processor) and at least one storage device (e.g., a memory). Each function described in the above embodiments is implemented by executing the program using the control device and storage device.

The program may be recorded on one or more non-transitory computer-readable storage media. These storage media may be provided in the image forming apparatus 1 but need not be. In the latter case, the program may be provided to the image forming apparatus 1 through any wired or wireless transmission medium.

All or some of the functions of the controller 61 can also be implemented by logic circuits. For example, an integrated circuit having logic circuits that function as the controller 61 falls within the scope of this disclosure.

All or some of the functions of the controller 61 can also be implemented by a microprocessor built into an IC chip.

The present disclosure contains the following aspects.

(Aspect 1) According to Aspect 1, an image forming apparatus includes a device main body, a consumable, and a controller. The consumable is attachable to the device main body. The consumable includes a consumable memory for storing therein recycling history information. The recycling history information indicates a recycling history of the consumable. The consumable memory includes a first storage area and a second storage area. The first storage area is a storage area to which a usage amount of the consumable can be written. The second storage area is a storage area to which the usage amount of the consumable can be written. The controller is configured to perform a determining process to determine, based on the recycling history information, one of the first storage area and the second storage area as a storage area to which the usage amount is to be written.

(Aspect 2) In the image forming apparatus according to Aspect 1, when the consumable is not a recycled consumable based on the recycling history information, in the determining process the controller determines the first storage area as the storage area to which the usage amount is to be written, whereas when the consumable is a recycled consumable based on the recycling history information, in the determining process the controller determines the second storage area as the storage area to which the usage amount is to be written.

(Aspect 3) In the image forming apparatus according to Aspect 1 or 2, the controller is configured to further perform a writing process when the recycling history information indicates that the consumable is not a recycled consumable. The writing process is a process to write the usage amount to the first storage area.

(Aspect 4) In the image forming apparatus according to any one of Aspects 1 to 3, the controller is configured to further perform a writing process when the recycling history information indicates that the consumable is a recycled consumable. The writing process is a process to write the usage amount to the second storage area.

(Aspect 5) In the image forming apparatus according to any one of Aspects 1 to 4, the recycling history information indicates a recycle count for the consumable, and the determining process is a process to determine one of the first storage area and the second storage area as a storage area corresponding to the recycle count indicated by the recycling history information.

(Aspect 6) In the image forming apparatus according to any one of Aspects 1 to 5, the controller is configured to further perform a reception process to receive an instruction to recycle the consumable. The controller is configured to further perform, in response to the received instruction, an update process to update the recycling history information.

(Aspect 7) In the image forming apparatus according to Aspect 6, in the determining process the controller determines, based on the recycling history information updated by the update process, the storage area to which the usage amount is to be written. In the determining process the controller writes identification information to one of the first and second storage areas that is different from the storage area determined by the determining process. The identification information is information for identifying the consumable.

(Aspect 8) In the image forming apparatus according to Aspect 6 or 7, in the determining process the controller determines, based on the recycling history information updated by the update process, the storage area to which the usage amount is to be written, and in the determining process the controller initializes the storage area determined by the determining process.

(Aspect 9) In the image forming apparatus according to any one of Aspects 1 to 8, the usage amount includes at least one of a printed sheet count information and a dot count information. The printed sheet count information indicates a cumulative number of sheets printed by the image forming apparatus using the consumable. The dot count information indicates a cumulative number of dots printed by the image forming apparatus using the consumable.

(Aspect 10) In the image forming apparatus according to any one of Aspects 1 to 9, the consumable is a cartridge accommodating printing material, and the usage amount is a usage amount of the printing material.

(Aspect 11) In the image forming apparatus according to any one of Aspects 1 to 10, the recycling history information indicates a recycle count for the consumable, and the controller is configured to further perform an output process when the recycle count indicated by the recycling history information reaches a predetermined upper limit. The output process is a process to output nonrecyclable information indicating that the consumable is not recyclable.

(Aspect 12) In the image forming apparatus according to any one of Aspects 1 to 11, the usage amount is a usage amount of printing material, and the controller is configured to further perform an identification process based on at least one of a difference between the number of writes to the first storage area and an upper limit on the number of writes to the consumable memory and a difference between the number of writes to the second storage area and the upper limit. The identification process is a process to identify an amount corresponding to the at least one of the differences as an amount of the printing material with which the consumable can be refilled.

(Aspect 13) The image forming apparatus according to any one of Aspects 6 to 8, further includes an operating unit through which the controller receives the instruction in the reception process.

(Aspect 14) According to Aspect 14, there is provided a consumable memory for use by a consumable. The consumable memory is for storing therein recycling history information. The recycling history information indicates a recycling history of the consumable. The consumable memory includes a first storage area and a second storage area. The first storage area is a storage area to which a usage amount of the consumable can be written. The second storage area is a storage area to which the usage amount of the consumable can be written. Based on the recycling history information, one of the first storage area and the second storage area can be determined as a storage area to which the usage amount is to be written.

(Aspect 15) According to Aspect 15, there is provided a recycling method of recycling a consumable. The consumable includes a consumable memory for storing therein recycling history information. The recycling history information indicates a recycling history of the consumable. The consumable memory includes a first storage area and a second storage area. The first storage area is a storage area to which a usage amount of the consumable can be written. The second storage area is a storage area to which the usage amount of the consumable can be written. The recycling method includes determining, based on the recycling history information, one of the first storage area and the second storage area as a storage area to which the usage amount is to be written.

(Aspect 16) In the recycling method according to Aspect 15, when the consumable is not a recycled consumable based on the recycling history information, the determining determines the first storage area as the storage area to which the usage amount is to be written, whereas when the consumable is a recycled consumable based on the recycling history information, the determining determines the second storage area as the storage area to which the usage amount is to be written.

(Aspect 17) The recycling method according to Aspect 15 or 16, further includes writing the usage amount to the first storage area when the recycling history information indicates that the consumable is not a recycled consumable.

(Aspect 18) The recycling method according to any one of Aspects 15 to 17, further includes writing the usage amount to the second storage area when the recycling history information indicates that the consumable is a recycled consumable.

(Aspect 19) In the recycling method according to any one of Aspects 15 to 18, the recycling history information indicates a recycle count for the consumable, and the determining determines one of the first storage area and the second storage area as a storage area corresponding to the recycle count indicated by the recycling history information.

(Aspect 20) The recycling method according to any one of Aspects 15 to 19, further includes receiving an instruction to recycle the consumable, and updating the recycling history information in response to the received instruction.

(Aspect 21) In the recycling method according to Aspect 20, the determining determines, based on the recycling history information updated by the updating, the storage area to which the usage amount is to be written, and the determining writes identification information to one of the first and second storage areas that is different from the storage area determined as the storage area to which the usage amount is to be written. The identification information is information for identifying the consumable.

(Aspect 22) In the recycling method according to Aspect 20 or 21, the determining determines, based on the recycling history information updated by the updating, the storage area to which the usage amount is to be written, and the determining initializes the storage area determined as the storage area to which the usage amount is to be written.

(Aspect 23) In the recycling method according to any one of Aspects 15 to 22, the usage amount includes at least one of a printed sheet count information and a dot count information. The printed sheet count information indicates a cumulative number of sheets printed by an image forming apparatus using the consumable. The dot count information indicates a cumulative number of dots printed by the image forming apparatus using the consumable.

(Aspect 24) In the recycling method according to any one of Aspects 15 to 23, the consumable is a cartridge accommodating printing material, and the usage amount is a usage amount of the printing material.

(Aspect 25) In the recycling method according to any one of Aspects 15 to 24, the recycling history information indicates a recycle count for the consumable. The recycling method further includes outputting nonrecyclable information when the recycle count indicated by the recycling history information reaches a predetermined upper limit. The nonrecyclable information indicates that the consumable is not recyclable.

(Aspect 26) In the recycling method according to any one of Aspects 15 to 25, the usage amount is a usage amount of printing material. The recycling method further includes identifying, based on at least one of a difference between the number of writes to the first storage area and an upper limit on the number of writes to the consumable memory and a difference between the number of writes to the second storage area and the upper limit, an amount corresponding to the at least one of the differences as an amount of the printing material with which the consumable can be refilled.

(Aspect 27) In the recycling method according to any one of Aspects 20 to 22, the receiving receives the instruction through an operating unit of an image forming apparatus.

The image forming apparatus according to Aspect 1 can suppress the number of rewrites to the consumable memory from reaching an upper limit when the consumable is refilled with printing material without replacing the consumable memory.

The image forming apparatus according to Aspect 2 requires fewer rewrites to each storage area than a configuration in which the storage area to which the usage amount is to be written is not changed based on whether the consumable is a recycled consumable or not.

The image forming apparatus according to Aspect 3 requires fewer rewrites to each storage area than a configuration in which the writing area is not changed based on the recycling history information.

The image forming apparatus according to Aspect 4 requires fewer rewrites to each storage area than a configuration in which the writing area for the usage amount is not changed based on the recycling history information.

The image forming apparatus according to Aspect 5 requires, even when the consumable is recycled a plurality of times, fewer rewrites to each storage area than a configuration in which the storage area for writing the usage amount is not changed based on the recycle count.

The image forming apparatus according to Aspect 6 can distribute the number of rewrites to a plurality of storage areas by determining the storage area for writing the usage amount based on the recycling history information.

The image forming apparatus according to Aspect 7 can reduce the number of rewrites to each storage area and effectively utilize the storage area other than the storage area to which the usage amount is written.

The image forming apparatus according to Aspect 8 can suppress the usage amount of the consumable stored in the consumable memory from becoming inconsistent with the actual value due to recycling.

The image forming apparatus according to Aspect 9 can suppress the number of times the printed sheet count information or dot count information is rewritten to the consumable memory from reaching the upper limit.

The image forming apparatus according to Aspect 10 enables recycling in which the number of times the usage amount of printing material in the cartridge after recycling is written to the consumable memory does not reach the upper limit.

The image forming apparatus according to Aspect 11 can let the user know when recycling is not possible.

The image forming apparatus according to Aspect 12 identifies, based on the number of writes to the consumable memory, the amount of printing material with which the consumable can be refilled. Accordingly, the consumable memory can continue to be used until the number of rewrites to the memory reach the upper limit.

The image forming apparatus according to Aspect 13 enables the user to input a recycling instruction via the operation unit (e.g., a touchscreen) provided in the image forming apparatus.

The consumable memory according to Aspect 14 can suppress the number of rewrites to the consumable memory from reaching the upper limit when the consumable is refilled with printing material without replacing the consumable memory.

Each of the recycling methods according to Aspects 15 to 27 obtains the same effects as the image forming apparatus according to a corresponding one of Aspects 1 to 13.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Accordingly, an embodiment obtained by suitably combining technical means disclosed in different embodiments also falls within the technical scope of the present disclosure. Further, the present disclosure includes the phrases "at least one of A and B", "at least one of A, B, and C", and the like as alternative expressions that mean one or more of A and B, and one or more of A, B, and C, and the like, respectively. For example, the phrase "at least one of A, B, and C" means "(A), (B), (C), (A and B), (A and C), (B and C) or (A, B and C)".

What is claimed is:

1. An image forming apparatus comprising:
    a device main body;
    a consumable attachable to the device main body, the consumable comprising a consumable memory for storing therein recycling history information indicating a recycling history of the consumable, the consumable memory comprising:
        a first storage area to which a usage amount of the consumable can be written; and
        a second storage area to which the usage amount of the consumable can be written; and
    a controller configured to perform:
        a determining process to determine, based on the recycling history information, one of the first storage area and the second storage area as a storage area to which the usage amount is to be written.

2. The image forming apparatus according to claim 1,
    wherein in the determining process the controller determines, based on the recycling history information, as the storage area to which the usage amount is to be written:
        the first storage area when the consumable is not a recycled consumable; and
        the second storage area when the consumable is a recycled consumable.

3. The image forming apparatus according to claim 1,
    wherein the controller is configured to further perform, when the recycling history information indicates that the consumable is not a recycled consumable:
        a writing process to write the usage amount to the first storage area.

4. The image forming apparatus according to claim 1,
    wherein the controller is configured to further perform, when the recycling history information indicates that the consumable is a recycled consumable:
        a writing process to write the usage amount to the second storage area.

5. The image forming apparatus according to claim 1,
    wherein the recycling history information indicates a recycle count for the consumable, and
    wherein the determining process is a process to determine one of the first storage area and the second storage area as a storage area corresponding to the recycle count indicated by the recycling history information.

6. The image forming apparatus according to claim 1,
    wherein the controller is configured to further perform:
        a reception process to receive an instruction to recycle the consumable; and
        in response to the received instruction, an update process to update the recycling history information.

7. The image forming apparatus according to claim 6,
    wherein in the determining process,
        the controller determines, based on the recycling history information updated by the update process, the storage area to which the usage amount is to be written, and
        the controller writes identification information to one of the first and second storage areas that is different from the storage area determined by the determining process, the identification information being information for identifying the consumable.

8. The image forming apparatus according to claim 6,
    wherein in the determining process,
        the controller determines, based on the recycling history information updated by the update process, the storage area to which the usage amount is to be written, and
        the controller initializes the storage area determined by the determining process.

9. The image forming apparatus according to claim 6, further comprising:
    an operating unit through which the controller receives the instruction in the reception process.

10. The image forming apparatus according to claim 1,
    wherein the usage amount includes at least one of:
        printed sheet count information indicating a cumulative number of sheets printed by the image forming apparatus using the consumable; and
        dot count information indicating a cumulative number of dots printed by the image forming apparatus using the consumable.

11. The image forming apparatus according to claim 1,
    wherein the consumable is a cartridge accommodating printing material, and
    wherein the usage amount is a usage amount of the printing material.

12. The image forming apparatus according to claim 1,
    wherein the recycling history information indicates a recycle count for the consumable, and wherein the controller is configured to further perform, when the recycle count indicated by the recycling history information reaches a predetermined upper limit:

an output process to output nonrecyclable information indicating that the consumable is not recyclable.

13. The image forming apparatus according to claim 1, wherein the usage amount is a usage amount of printing material, and wherein the controller is configured to further perform, based on at least one of a difference between the number of writes to the first storage area and an upper limit on the number of writes to the consumable memory and a difference between the number of writes to the second storage area and the upper limit:

an identification process to identify an amount corresponding to the at least one of the differences as an amount of the printing material with which the consumable can be refilled.

14. A consumable memory for use by a consumable, the consumable memory being for storing therein recycling history information indicating a recycling history of the consumable, the consumable memory comprising:

a first storage area to which a usage amount of the consumable can be written; and a second storage area to which the usage amount of the consumable can be written, wherein, based on the recycling history information, one of the first storage area and the second storage area can be determined as a storage area to which the usage amount is to be written.

15. A recycling method of recycling a consumable, the consumable comprising a consumable memory for storing therein recycling history information indicating a recycling history of the consumable, the consumable memory comprising a first storage area to which a usage amount of the consumable can be written and a second storage area to which the usage amount of the consumable can be written, the recycling method comprising:

determining, based on the recycling history information, one of the first storage area and the second storage area as a storage area to which the usage amount is to be written.

16. The recycling method according to claim 15,
wherein, based on the recycling history information, the determining determines as the storage area to which the usage amount is to be written:

the first storage area when the consumable is not a recycled consumable; and the second storage area when the consumable is a recycled consumable.

17. The recycling method according to claim 15, further comprising:

writing, when the recycling history information indicates that the consumable is not a recycled consumable, the usage amount to the first storage area.

18. The recycling method according to claim 15, further comprising:

writing, when the recycling history information indicates that the consumable is a recycled consumable, the usage amount to the second storage area.

19. The recycling method according to claim 15,
wherein the recycling history information indicates a recycle count for the consumable, and wherein the determining determines one of the first storage area and the second storage area as a storage area corresponding to the recycle count indicated by the recycling history information.

20. The recycling method according to claim 15, further comprising:

receiving an instruction to recycle the consumable; and
updating, in response to the received instruction, the recycling history information.

21. The recycling method according to claim 20,
wherein the determining determines, based on the recycling history information updated by the updating, the storage area to which the usage amount is to be written, and wherein the determining writes identification information to one of the first and second storage areas that is different from the storage area determined as the storage area to which the usage amount is to be written, the identification information being information for identifying the consumable.

22. The recycling method according to claim 20,
wherein the determining determines, based on the recycling history information updated by the updating, the storage area to which the usage amount is to be written, and wherein the determining initializes the storage area determined as the storage area to which the usage amount is to be written.

23. The recycling method according to claim 20,
wherein the receiving receives the instruction through an operating unit of an image forming apparatus.

24. The recycling method according to claim 15,
wherein the usage amount includes at least one of:
printed sheet count information indicating a cumulative number of sheets printed by an image forming apparatus using the consumable; and dot count information indicating a cumulative number of dots printed by the image forming apparatus using the consumable.

25. The recycling method according to claim 15,
wherein the consumable is a cartridge accommodating printing material, and wherein the usage amount is a usage amount of the printing material.

26. The recycling method according to claim 15,
wherein the recycling history information indicates a recycle count for the consumable, the recycling method further comprising:
outputting, when the recycle count indicated by the recycling history information reaches a predetermined upper limit, nonrecyclable information indicating that the consumable is not recyclable.

27. The recycling method according to claim 15,
wherein the usage amount is a usage amount of printing material, the recycling method further comprising:
identifying, based on at least one of a difference between the number of writes to the first storage area and an upper limit on the number of writes to the consumable memory and a difference between the number of writes to the second storage area and the upper limit, an amount corresponding to the at least one of the differences as an amount of the printing material with which the consumable can be refilled.

* * * * *